(12) United States Patent
Takahashi et al.

(10) Patent No.: US 7,303,829 B2
(45) Date of Patent: Dec. 4, 2007

(54) MAGNETIC RECORDING MEDIUM

(75) Inventors: Kimio Takahashi, Miyagi (JP); Sachie Shoji, Miyagi (JP)

(73) Assignee: Sony Corporation, Tokyo (JP)

( * ) Notice: Subject to any disclaimer, the term of this patent is extended or adjusted under 35 U.S.C. 154(b) by 526 days.

(21) Appl. No.: 10/839,511

(22) Filed: May 5, 2004

(65) Prior Publication Data
US 2004/0241499 A1    Dec. 2, 2004

(30) Foreign Application Priority Data
May 30, 2003  (JP)  ............... P2003-155765
Jan. 5, 2004  (JP)  ............... P2004-000414

(51) Int. Cl.
*G11B 5/66*  (2006.01)
*G11B 5/70*  (2006.01)

(52) U.S. Cl. ..................................... 428/831

(58) Field of Classification Search ............ 428/831, 428/831.2, 832.3
See application file for complete search history.

(56) References Cited

FOREIGN PATENT DOCUMENTS

| JP | 04-335206 | * 11/1992 |
|---|---|---|
| JP | 2003-016617 | 1/2003 |

OTHER PUBLICATIONS

Machine translation of JP05-020662, Jan. 1993, Japan.*
English abstract JP04-335206, Nov. 1992, Japan.*
England abstract JP 01-124115, May 1989, Japan.*
English translation of JP 04-335206, Kunihiro Ueda, Nov. 1992.*
Japanese Office Action issued on Mar. 13, 2007.

\* cited by examiner

*Primary Examiner*—Holly Rickman
(74) *Attorney, Agent, or Firm*—Sonnenschein Nath & Rosenthal LLP

(57) ABSTRACT

There is provided a magnetic recording medium having an extremely thin magnetic layer, in which, not only corrosion of the magnetic layer is suppressed, but also the storage properties and the electromagnetic conversion properties are improved. The magnetic recording medium comprises: an elongated nonmagnetic substrate; a first shielding layer comprised of a metal or an alloy; a second shielding layer comprised of a material which is more hardly oxidized than the first shielding layer, and a magnetic layer, formed by a vacuum thin film formation technique, having a thickness of 55 nm or less. A total thickness of the first shielding layer and the second shielding layer is 2 to 50 nm.

6 Claims, 9 Drawing Sheets

MAGNETIC RECORDING MEDIUM

CROSS REFERENCES TO RELATED APPLICATIONS

The present document is based on Japanese Priority Documents JP 2003-055765 and 2004-000414, filed in the Japanese Patent Office on May 30, 2003 and Jan. 5, 2004, respectively, the entire contents of which being incorporated herein by reference.

BACKGROUND OF THE INVENTION

1. Field of the Invention

The present invention relates to a high-density recording type tape-form magnetic recording medium. More particularly, the present invention is concerned with a tape-form magnetic recording medium which is advantageously used in a magnetic recording/reproducing system using a high sensitivity magnetic head (MR head or GMR head).

2. Description of Related Art

In recent years, in fields of video tape recorder and the like, for improving image quality and recording density, there has been proposed a so-called thin metal film type magnetic recording medium which comprises a magnetic layer formed by depositing a magnetic material, such as a metal material, a Co—Ni alloy, a Co—Cr alloy, or a Co—CoO metal oxide, directly on a nonmagnetic support using a vacuum thin film formation technique. As the magnetic recording medium, for example, deposited tapes for high band 8 mm video tape recorder and digital video tape recorder are practically used.

The thin metal film type magnetic recording medium is excellent in its coercive force and squareness ratio, and has excellent electromagnetic conversion properties since its magnetic layer can be made extremely thin in a short wavelength region, and is extremely low in recording demagnetization or thickness loss during reproduction. In addition, the thin metal film type magnetic recording medium has various advantages, for example, in that, differing from a coating type magnetic recording medium, it does not contain a binder which is a nonmagnetic material in the magnetic layer, and hence a packing density of ferromagnetic metal fine particles can be increased.

In accordance with an increasing demand for magnetic recording medium, such as a magnetic tape, as a data streamer, development of magnetic recording medium having even higher recording density is desired. Recently, as a magnetic head for reproducing recorded information, instead of a conventional inductive head, a magnetoresistive magnetic head (hereinafter, frequently referred to as "MR head") or a giant magnetoresistive magnetic head (hereinafter, frequently referred to as "GMR head") is used. The MR head can detect very slight leakage magnetic flux from the magnetic layer with high sensitivity, and therefore can improve the recording density.

The MR head or GMR head has a detection limit at which the sensitivity for leakage magnetic flux is saturated, and hence cannot detect the leakage magnetic flux higher than a range acceptable by the design of the head. Therefore, there is a need to reduce a thickness of the magnetic layer in the magnetic recording medium to optimize the leakage magnetic flux of the magnetic layer. Generally, in a magnetic recording tape system, if deterioration of the magnetization amount of a tape is 16% or more, a satisfactory reproducing signal cannot be obtained due to the too large deterioration. For this reason, the system is formed on an assumption that deterioration of the tape magnetization amount is 15% or less.

Generally, in a magnetic recording medium, such as a metal evaporate tape, for the purpose of improving the storage properties and running durability of the magnetic layer, a protective film comprised of a diamond-like carbon (DLC) is formed on the magnetic layer. The protective film comprised of the DLC has excellent density, as compared to a protective film comprised of carbon deposited by another vacuum thin film formation technique, such as a sputtering process.

Deterioration of the magnetic layer is advanced by oxidation of a magnetic metal due to oxygen or moisture present in an atmosphere. A protective film having high density inhibits oxygen or moisture in an atmosphere from diffusing in the magnetic layer. Therefore, in a case where the protective film comprised of the DLC is formed, the storage properties of the magnetic layer can be drastically improved.

However, it is known that the magnetic layer suffers corrosion due to moisture or air which has passed through the nonmagnetic support, so that the electromagnetic conversion properties and durability of the magnetic recording medium deteriorate (see Patent documents 1 and 2). For preventing the corrosion of the magnetic layer from a nonmagnetic support side, in the magnetic recording medium described in Patent document 1, a metal film having a metal oxide film on its surface is provided as an undercoat film between the ferromagnetic metal thin film comprised mainly of Co and the nonmagnetic support. In the undercoat film, a metal which is baser than Co or a metal oxide is used. In the metal film in the undercoat film, a metal, such as Al, Zn, Mn, V, Zr, Cr, In, or Tl, is used, and, in the metal oxide film, an oxide of the above metal is used.

Patent document 1 states that a thickness of the metal film is preferably 50 to 200 nm, further preferably 80 to 150 nm, and that a thickness of the metal oxide film is preferably 2 to 100 nm, further preferably 4 to 25 nm. In addition, there is a description showing that a thickness of the entire magnetic layer is preferably 120 to 300 nm and the output can be satisfactorily increased in this case.

In the magnetic recording medium described in Patent document 2, a base film comprised of at least one metal selected from Al, Zn, Mn, V, Zr, Cr, Fe, In and Tl is formed between the nonmagnetic support and the ferromagnetic thin metal film, and further, on the ferromagnetic thin metal film, a plasma polymerized film containing C and H is formed as a top coat film. Patent document 2 states that a thickness of the base film is preferably 50 to 150 nm, further preferably 80 to 120 nm, and that the ferromagnetic metal thin film is preferably comprised mainly of Co. Like the magnetic recording medium described in Patent document 1, there is a description showing that the thickness of the entire magnetic layer is preferably 120 to 300 nm and the output can be satisfactorily increased in this case.

On the other hand, as a method for preventing corrosion of the magnetic layer due to moisture or a corrosive gas, there has been known a method in which a layer comprised of aluminum (Al), chromium (Cr), titanium (Ti), or copper (Cu) having a thickness of 5 to 300 nm is formed under the magnetic layer (see, for example, Patent document 3). In Patent document 3, the thickness of the magnetic layer is as large as, for example, 200 nm, and the corrosion resistance to $SO_2$ gas which is a corrosive gas is evaluated.

[Patent Document 1]

Japanese Patent Application Laid-Open Specification No. 4-335206 (Japanese Patent No. 3093818)

[Patent Document 2]

Japanese Patent Application Laid-Open Specification No. 5-20662

[Patent Document 3]

Japanese Patent Application Laid-Open Specification No. 1-124115

[Non-patent Document 1]

"Magnetoresistive head and spin valve head—Foundation and application—, 2nd edition", translated by Kazuhiko Hayashi, 2002, published by Maruzen Co., Ltd.

As mentioned above, in the magnetic tape used in the system employing a high sensitivity magnetic head, such as an MR head, for preventing saturation of the magnetic head, the thickness of the magnetic layer is required to be small, for example, about 50 nm or less. In the GMR head having higher reproduction sensitivity than that of the MR head and being suitable for recording with high density at high frequencies, the thickness of the magnetic layer is required to be further smaller.

If the thickness of the magnetic layer is reduced, the magnetic layer is more likely to deteriorate. Therefore, even in a case where the base film described in Patent documents 1 and 2 is formed, deterioration of the magnetic layer cannot be satisfactorily prevented. In addition, in a case where the base film having the thickness described in Patent documents 1 and 2 is formed in a magnetic recording medium in which the thickness of the magnetic layer is as small as about 50 nm or less, the base film is too large in thickness and roughens a surface of the magnetic layer, thus increasing a medium noise as the magnetic recording medium. This problem is more serious when the GMR head having higher reproduction sensitivity than that of the MR head is used as a head for reproduction.

Patent document 3 has a description showing that, when a layer comprised of Al, Ti or the like is formed under the magnetic layer, the coercive force is improved, and, according to the below-described experimental results of the present inventors, it has been confirmed that, when a metal layer having a thickness as small as 30 nm or less is formed under the magnetic layer, the coercive force is lowered. However, when a metal layer having a thickness larger than that thickness is formed under the magnetic layer, an increase of the coercive force is also observed. In other words, when a range of the thickness of the magnetic layer or the base layer is changed, the change of the magnetic properties depending on the thickness of the base layer exhibits different behaviors.

Deterioration of storage properties at a high humidity at a high temperature is actualized when the thickness of the magnetic layer is 100 nm or less, and is different in a mechanism (reaction) of magnetization deterioration from corrosion caused by $SO_2$ gas. In the actual experiments, there are often obtained results in which one of the storage properties at a high humidity at a high temperature and a corrosion resistance to $SO_2$ gas is very excellent and another is poor. That is, the method for improving the corrosion resistance to $SO_2$ gas is not always effective in improving the storage properties at a high humidity at a high temperature.

The present invention has been made for solving the above-mentioned various problems, and the present invention provides a magnetic recording medium which advantageously increases the recording density, and which effectively prevents deterioration of the magnetic layer due to the storage.

SUMMARY OF THE INVENTION

The magnetic recording medium of the present invention comprises: a continuous nonmagnetic support; a first shielding layer comprised of a metal or an alloy; a second shielding layer comprised of a material which is more hardly oxidized than the first shielding layer, wherein a total thickness of the first shielding layer and the second shielding layer is 2 to 50 nm; and a magnetic layer, formed on the second shielding layer by a vacuum thin film formation technique, having a thickness of 55 nm or less.

In addition, the magnetic recording medium of the present invention comprises: a continuous nonmagnetic support; a first shielding layer comprised of a metal or an alloy; a second shielding layer comprised of a material which is more hardly oxidized than the first shielding layer; and a magnetic layer, formed by a vacuum thin film formation technique, having a thickness of 55 nm or less, wherein the first shielding layer has a thickness of 1 to 10 nm and the second shielding layer has a thickness of 1 to 10 nm.

It is preferred that the first shielding layer is a metal layer or alloy layer comprised of at least one of aluminum and titanium, and the second shielding layer is a metal layer comprised of any one of nickel, copper, silver, gold, palladium, and chromium, an aluminum oxide layer, a silicon oxide layer, or a silicon nitride layer. In reproduction of the magnetic recording medium of the present invention, it is preferred to use an MR head or a GMR head.

By virtue of having the above construction, the magnetic recording medium having an extremely thin magnetic layer is advantageous not only in that corrosion of the magnetic layer is suppressed, but also in that the storage properties and the electromagnetic conversion properties are improved.

In the present invention, even in the magnetic recording medium in which the thickness of the magnetic layer is as small as about 55 nm or less, by providing so-called shielding layers of a double-layer structure comprised of specific materials as a base layer for the magnetic layer, deterioration of the magnetic layer is effectively suppressed, and, in magnetic recording tape systems for use in various applications, such as tape streamer application, not only can recording and reproduction be performed with high recording density, but also recorded information can be stably stored for a long term.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Hereinbelow, preferred embodiments of the magnetic recording medium of the present invention will be described in detail.

Figure 1:
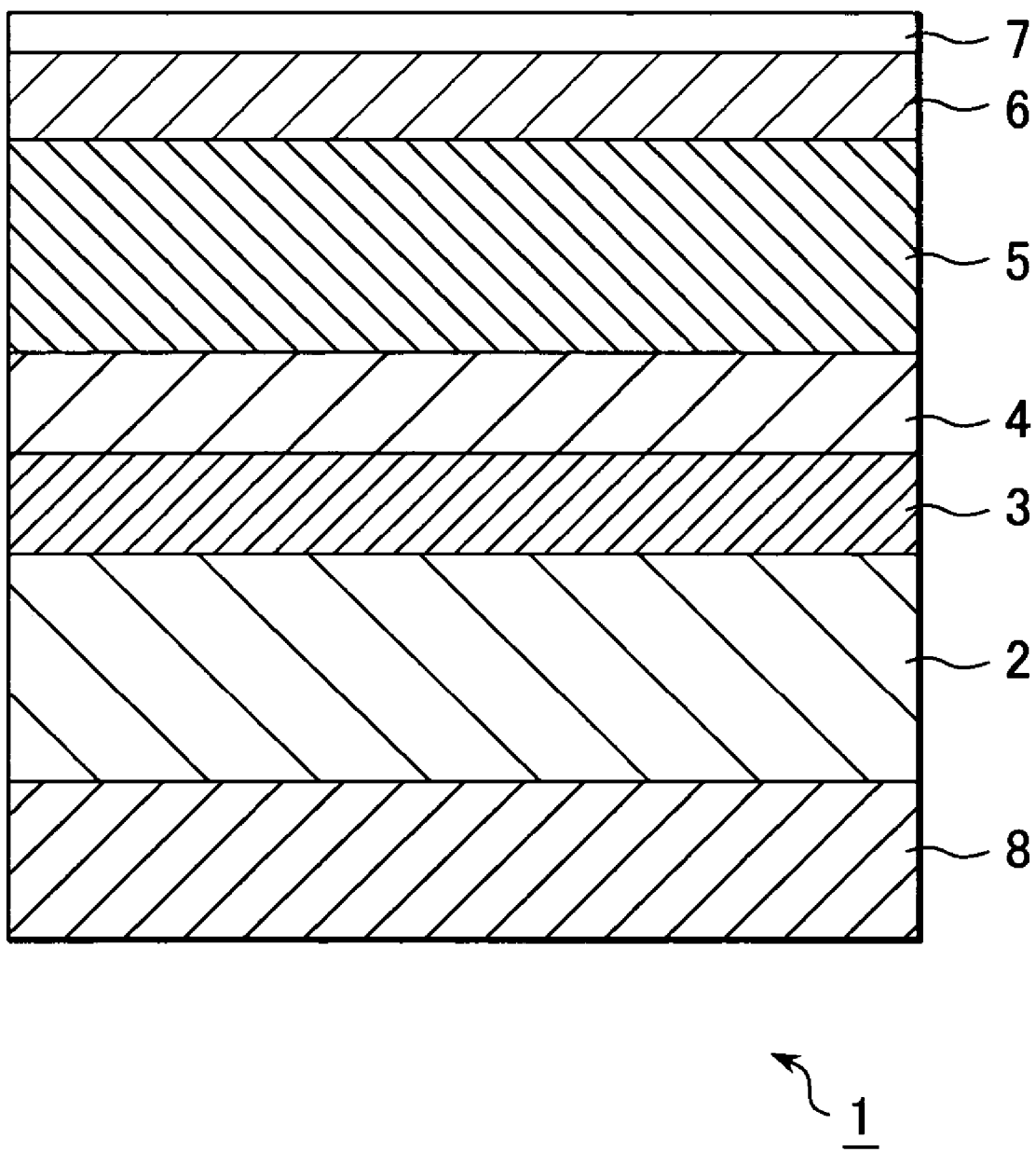
FIG. 1 is a diagrammatic cross-sectional view of one form of a magnetic recording medium of the present invention.

FIG. 1 is a diagrammatic cross-sectional view of a magnetic recording tape medium according to the present embodiment. As shown in FIG. 1, in a magnetic recording medium 1 of the present embodiment, on a nonmagnetic support 2, a first shielding layer 3 and a second shielding layer 4 are successively stacked, and a magnetic layer 5 is formed on the second shielding layer 4. A protective film 6 is formed on the magnetic layer 5, and a lubricating layer 7 is formed on the protective film 6. Assuming that a plane of the nonmagnetic support 2 on the side of the magnetic layer 5 is a top surface, a backcoating layer 8 is formed on the back surface of the nonmagnetic support 2.

The magnetic recording medium 1 of the present embodiment is reproduced in a state such that it is made slide-contact with an MR head or a GMR head. The "slide-contact" used in the present invention means any of a case where a head moves while rubbing against a stationary magnetic recording medium, a case where a magnetic recording medium travels while rubbing against a fixed head, and a case where both a magnetic recording medium and a head move while rubbing against each other.

In the magnetic recording medium 1 of the present embodiment, the magnetic layer 5 is formed by a vacuum thin film formation technique, and a thickness of the magnetic layer 5 is 55 nm or less. The thickness of the magnetic layer 5 is controlled to be in such a range that an MR head or a GMR head used for reproduction of the magnetic recording medium 1 is not saturated. Therefore, the thickness of the magnetic layer 5 when using a GMR head in the reproduction is further smaller than that when using an MR head.

As a material for the first shielding layer 3, a metal comprised of at least one of Al and Ti or an alloy of any one of them is preferred. As a material for the second shielding layer 4, a metal comprised of any one of Ni, Cu, Ag, Au, Pd, and Cr, or aluminum oxide, silicon oxide, or silicon nitride is preferred. The magnetic recording medium 1 of the present embodiment has the shielding layers 3, 4 of a double-layer structure, and it is preferred that the total thickness of the two shielding layers 3, 4 is 2 to 50 nm.

Further, it is preferred that the thickness of the first shielding layer 3 is 1 to 10 nm and the thickness of the second shielding layer 4 is 1 to 10 nm. In this case, the medium noise can be effectively lowered, thus improving the C/N ratio.

By forming the shielding layers 3, 4 having the above construction, deterioration of the magnetic layer 5 from the back surface side of the nonmagnetic support 2 is effectively suppressed, so that storage properties of the magnetic layer 5 are drastically improved. Deterioration of the magnetic layer 5 is advanced by oxidation of a magnetic metal due to oxygen or moisture present in an atmosphere. The present inventor has made studies on the oxidation mechanism of the magnetic layer by analyzing a oxygen distribution in a thicknesswise direction with respect to a sample having no shielding layer mentioned above in which oxidation proceeds.

As a result, it has been clarified that, in the magnetic layer having a thickness of about 55 nm or less used in an MR head or a GMR head, the oxidation of the magnetic layer proceeds not from the top surface side (protective film side) but from the back surface side (nonmagnetic support side). The reason for this resides in that the nonmagnetic support 2, e.g., polyethylene terephthalate (PET) used in a magnetic recording tape medium, such as a metal evaporated tape, has high permeability to oxygen or moisture.

In a case where the thickness of the magnetic layer is as small as about 55 nm or less, a serious problem of deterioration of the magnetic layer from the back surface side due to oxidation arises. The present inventor has made extensive studies on the material and deposition method for the shielding layer. As a result, it has been found that, especially when Al, Ti, or an alloy of any one of them is deposited in vacuum as a material for the shielding layer, deterioration of the magnetic layer due to the storage can be almost prevented.

However, when a shielding layer of a single layer is formed from Al, Ti, or an alloy of any one of them as a material, another problem occurs in that the magnetic properties of the metal evaporated tape become poor. The reason for this is found to reside in that the shielding layer, which is comprised of Al, Ti, or an alloy of any one of them and which is deposited in vacuum, has a very high reducing ability and hence changes the oxygen distribution in the magnetic layer.

For solving this problem, the present inventor has made an attempt to form the second shielding layer 4 to suppress reduction (movement of oxygen) of the magnetic layer, maintaining or improving the magnetic properties. As a result, it has been found that, by forming, as the second shielding layer 4, a layer from a material of a metal comprised of any one of Ni, Cu, Ag, Au, Pd, and Cr, or aluminum oxide, silicon oxide, or silicon nitride, the influence of the first shielding layer 3 can be shielded or effectively lowered.

It has been confirmed that, when the shielding layers 3, 4 of a double layer structure are provided as mentioned above, deterioration due to corrosion of the magnetic layer can be prevented, and the magnetic properties are equivalent to those of the magnetic recording medium having no shielding layer provided, or improved.

In addition, the present inventor has found that, when the total thickness of the two stacked shielding layers 3, 4 is 2 to 50 nm, the corrosion resistance can be improved without lowering the electromagnetic conversion properties.

As mentioned above, the magnetic recording medium 1 of the present invention has the construction in which the first shielding layer 3 having a high reducing ability to suppress oxidation of the magnetic layer 5 due to oxygen, moisture or the like which has passed through the nonmagnetic support 2, and the second shielding layer 4, which suppresses the movement of oxygen from the magnetic layer 5 to the first shielding layer 3 and which does almost not affect the magnetic properties, are stacked on one another. By virtue of having this construction, the magnetic tape medium can be improved in the storage properties without lowering the magnetic properties.

Next, the layers constituting the magnetic recording medium 1 of the present invention are individually described in more detail.

As a material for the nonmagnetic support 2, any conventionally known materials which are generally used as a substrate for a magnetic recording medium of this type can be used. Examples include polyesters, such as polyethylene terephthalate (PET) and polyethylene naphthalate (PEN); polyolefins, such as polyethylene and polypropylene; cellulose derivatives, such as cellulose triacetate; and plastics, such as polycarbonate, polyimide, polyamide, and polyamideimide.

On the top surface of the nonmagnetic support 2, a coating layer may be formed from a composition comprising a binder resin, filler, and a surfactant, and the coating layer can provide a finely uneven surface or improve the mechanical strength. Examples of binder resins include aqueous polyester resins, aqueous acrylic resins, and aqueous polyurethane resin.

Examples of filler include particles comprised of a heat resistant polymer, silicon dioxide, and calcium carbonate. It is preferred that the mean particle size of the filler contained in the coating layer is 5 to 30 nm, and the density of the surface projections formed by the filler is about 500,000 to 30,000,000 projections/mm$^2$. In this case, the magnetic recording medium can be improved in both the running durability and the electromagnetic conversion properties.

The first shielding layer 3 is provided for the purpose of improving the storage properties of the magnetic layer 5. The first shielding layer 3 may be formed by a vacuum thin film formation technique. As a material for the first shielding layer 3, a metal comprised of at least one of Al and Ti, or an alloy of any one of them is preferred. As the material for the first shielding layer 3, a material which is more easily oxidized than the material for the magnetic layer 5 is used. For example, Co responsible for the magnetic properties of the Co—CoO magnetic layer 5 has a standard hydrogen electrode potential of −0.277 V, whereas, Al and Ti have standard hydrogen electrode potentials of −1.662 V and −1.628 V, respectively. Therefore, the first shielding layer 3 is selectively oxidized, as compared to the magnetic layer 5, so that deterioration of the magnetic layer 5 is effectively suppressed.

Examples of vacuum thin film formation techniques include various types of physical vapor deposition (hereinafter, frequently referred to simply as "PVD") processes. As a specific example of the PVD process, there can be mentioned a vacuum deposition method in which a metal material as a material for the shielding layer is evaporated by heating in vacuum and deposited on a nonmagnetic support. In addition, there can be mentioned an ion plating process in which a metal material as a material for the shielding layer is evaporated in discharge.

Further, there can be mentioned a sputtering process in which a glow discharge is caused in an atmosphere comprised mainly of argon, and argon ions generated eject surface atoms of a target made of a material for the shielding layer to deposit a shielding layer. These PVD processes can easily form the shielding layer and exhibit excellent deposition properties.

The second shielding layer 4 is provided for the purpose of suppressing deterioration of the magnetic properties of the magnetic layer 5 due to the first shielding layer 3. Like the first shielding layer 3, the second shielding layer 4 may be deposited by a vacuum thin film formation technique, such as a vacuum deposition method. As a technique for depositing an oxide or nitride material, there is a reactive sputtering process in which a glow discharge is caused in an atmosphere comprised mainly of argon and oxygen or nitrogen, and the argon and oxygen or nitrogen ions generated eject surface atoms of a target made of a metal material as a material for the shielding layer while allowing the surface atoms to undergo an oxidation reaction or a nitrogenation reaction. The reactive sputtering process is one of the PVD processes, and can easily form the second shielding layer 4 comprised of an oxide or nitride material and exhibits excellent deposition properties.

Alternatively, the second shielding layer 4 can be formed by a chemical vapor deposition (hereinafter, frequently referred to simply as "CVD") process using, for example, a plasma CVD continuous film forming apparatus. As a method for the CVD process, any conventionally known method, such as a mesh electrode DC plasma method, an electron beam excited plasma source method, a cold cathode ion source method, an ionized deposition evaporation method, or a catalyst CVD method, can be used.

The mesh electrode DC plasma method requires an electrode layer for deposition current on a substrate, but advantageously has excellent deposition rate. The electron beam excited plasma source method, the cold cathode ion source method, the ionized deposition evaporation method, and the catalyst CVD method require no electrode layer and have an advantage in that direct deposition on a nonmagnetic support comprised of an insulating material is possible. As a raw material gas in the CVD process, any conventionally known material, such as silane and ammonia, can be used. During the generation of a plasma, He, $N_2$, $O_2$ or the like may be introduced.

Examples of materials constituting the second shielding layer 4 include Ni, Cu, Ag, Au, Pd, Cr, aluminum oxide, silicon oxide, and silicon nitride.

The material for forming the second shielding layer 4 is a material which is more hardly oxidized than the first shielding layer 3. In this case, the magnetic properties of the magnetic layer 5 can be maintained or improved. In addition to the above materials, the second shielding layer 4 can be formed using a metal material, such as Co, Fe, Zr, Pt, Ta, W, Al, Mn, Cr, V, Nb, Mo, or Ru, an alloy of two or more of these metals, a compound of the metal material and oxygen or nitrogen, or a compound, such as $SiO_2$, silicon nitride, indium tin oxide (ITO), $In_2O_3$, or ZrO.

For preventing deterioration of the magnetic properties of the magnetic layer 5 due to reduction of the magnetic layer 5 by the first shielding layer 3, as the material for the second shielding layer 4, a metal comprised of any one of Ni, Cu, Ag, Au, Pd, and Cr, or aluminum oxide, silicon oxide, or silicon nitride is especially preferred.

The magnetic layer 5 is formed by a vacuum thin film formation technique. Examples of vacuum thin film formation techniques include the above-mentioned vacuum deposition method and PVD processes, such as an ion plating process and a sputtering process.

The magnetic recording medium of the present invention is preferably used in a recording/reproducing apparatus having an MR head or a GMR head. For lowering the noise to improve the C/N (carrier/noise), it is desired that the thickness of the magnetic layer 5 is extremely small, and it is preferred that the thickness of the magnetic layer 5 is 5 to 55 nm. When the thickness of the magnetic layer 5 is less than 5 nm, a satisfactory reproduction output may not be obtained even using a high sensitivity GMR head. On the other hand, when the thickness of the magnetic layer 5 is more than 55 nm, the MR head or GMR head may be saturated to make it impossible to obtain a reproducing signal.

As the ferromagnetic metal material constituting the magnetic layer 5, any conventionally known metal material or alloy which is generally used in preparation of a magnetic recording medium can be used. Examples include ferromagnetic metals, such as Co and Ni; materials, such as Co—Ni alloys, Co—Fe alloys, Co—Ni—Fe alloys, Co—Cr alloys, Co—Pt alloys, Co—Pt—B alloys, Co—Cr—Pt alloys, Co—Cr—Ta alloys, and Co—Cr—Pt—Ta alloys; ones obtained by deposing the above material in an oxygen atmosphere to introduce oxygen into the film, and ones obtained by introducing into the above material one, or two or more other elements.

Alternatively, the magnetic layer 5 may be formed from a granular material, such as Co—Pt—$SiO_2$ or Co—Pt—$Al_2O_3$, obtained by simultaneously depositing the above ferromagnetic material and $Al_2O_3$, $SiO_2$, $InO_2$, $ZrO_2$ or the like which does not form a solid solution.

For securing more excellent running durability and corrosion resistance, a protective film 6 comprised of diamond-like carbon or the like is required to be formed on the magnetic layer 5. Like the first and second shielding layers 3, 4, the protective film 6 can be formed by a vacuum thin film formation technique, such as a CVD process or a sputtering process.

On a back surface of the nonmagnetic support 2, a backcoating layer 8 is provided for the purpose of improving the runnability of the magnetic recording medium 1 and imparting antistatic properties.

It is preferred that the thickness of the backcoating layer 8 is about 0.2 to 0.7 μm. The backcoating layer 8 may be formed by, for example, applying a composition for back coat layer to the back surface of the nonmagnetic support 2. The composition for backcoating layer is prepared by dispersing solid particles, such as an inorganic pigment, in a binder and mixing with an organic solvent selected depending on a type of the binder.

It is desired that an uppermost surface on at least one side of the plane on which the magnetic layer is formed (the protective film 6 side) and the back surface of the nonmagnetic support 2 is coated with a lubricant agent or an anticorrosive agent. FIG. 1 shows an example in which a solution containing a lubricant agent is applied onto the protective film 6 to form a lubricating layer 7. The magnetic recording medium of the present invention is not limited to one in which the magnetic layer is of a single layer, but a plurality of magnetic layers may be stacked on one another. When stacking a plurality of magnetic layers, the two shielding layers may be formed between the magnetic layers.

The magnetic recording medium of the present invention is preferably used as a magnetic tape in, for example, a helical scan magnetic recording system using an MR reproducing head or a GMR reproducing head. The "MR head" used herein means a magnetic head only used for reproduction, which detects a signal from the magnetic recording medium utilizing a magnetoresistance effect.

Generally, the MR head has higher sensitivity and larger reproduction output than those of an inductive magnetic head which performs recording and reproduction utilizing electromagnetic induction, and hence it is suitable for recording with high density. Therefore, by using the MR head as a magnetic head for reproduction, the recording density can be further increased.

The MR head has an MR element unit having a substantially rectangular form, which is disposed between a pair of magnetic shields comprised of a soft magnetic material, such as Ni—Zn polycrystalline ferrite, through insulating materials. At both ends of the MR element unit are provided a pair of terminals, and a sense current can be supplied to the MR element unit through the terminals.

In a case where a signal from the magnetic tape is reproduced using the MR head, the magnetic tape is made to slide-contact with the MR element unit. Then, a sense current is supplied to the MR element unit through the terminals connected to the both ends of the MR element unit in a state such that the magnetic tape is slid the MR unit portion, and a change of the voltage of the sense current is detected.

In a case where the sense current is supplied to the MR element unit in a in slide-contact therewith such that the magnetic tape is slid, the direction of magnetization of the MR element unit changes according to the magnetic field from the magnetic tape, so that a relative angle between a direction of the sense current supplied to the MR element unit and a direction of magnetization changes. Thus, the resistance value changes depending on the relative angle between the direction of magnetization of the MR element unit and the direction of the sense current.

Therefore, when a current value of the sense current supplied to the MR element unit is fixed, the sense current changes in voltage. By detecting the voltage change of the sense current, the signal magnetic field from the magnetic tape is detected, so that a signal recorded on the magnetic tape is reproduced.

In the MR head used, the MR element formed in the MR element unit may be any element exhibiting a magnetoresistance effect, and, for example, a so-called giant magnetoresistive element (GMR element) comprising a plurality of thin films stacked on one another and exhibiting a more remarkable magnetoresistance effect can be used.

As a method for applying a bias magnetic field to the MR element, a soft adjacent layer (SAL) bias method, and various methods, such as a permanent-magnet bias method, a shunt current bias method, a self bias method, an exchange bias method, a barber pole method, a divided element method, and a servo bias method, can be used. With respect to the giant magnetoresistance effect and bias methods, reference can be made to, for example, the Non-patent document 1 above.

Next, the effect of the shielding layer in the magnetic recording medium of the present invention is described in detail.

Figure 3:
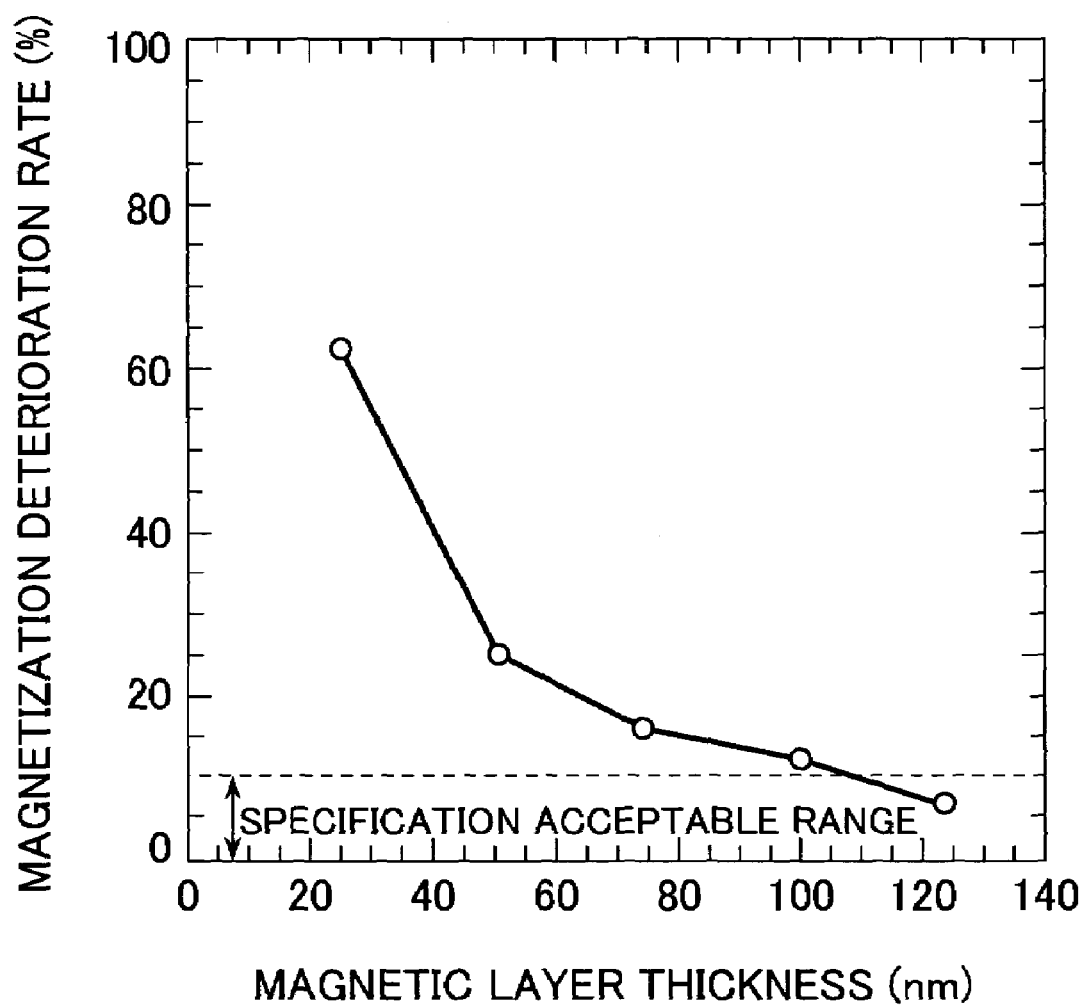
FIG. 3 is a graph showing relationship between a thickness of a magnetic layer and a magnetization deterioration rate.

As mentioned above, when reducing the thickness of the magnetic layer for the purpose of rendering the magnetic recording medium suitable for MR head, the magnetization amount of the magnetic layer is markedly reduced due to the storage. The relationship between the thickness of a Co magnetic layer and a magnetization deterioration rate is shown in FIG. 3. The magnetization deterioration rate is determined by storing a magnetic recording medium in a high-temperature high-humidity environment and measuring a saturation magnetization $M_{s0}$ of the magnetic recording medium before the storage and a saturation magnetization $M_{s1}$ after the storage, and making calculation using the following formula (1).

$$\text{Magnetization deterioration rate (\%)} = \{(M_{s0}-M_{s1})/M_{s0}\} \times 100 \qquad (1)$$

As shown in FIG. 3, when the thickness of the magnetic layer is smaller than about 50 nm, the magnetization deterioration rate rapidly increases. From a practical point of view, it is desired that the magnetization deterioration rate is 10% or less, and, when the thickness of the magnetic layer is 50 nm or less, the magnetization deterioration rate is not acceptable. When the magnetic recording medium is applied to the GMR head having higher reproduction sensitivity than that of the MR head, the thickness of the magnetic layer in this magnetic recording medium is smaller than that in the magnetic recording medium for MR head. In the magnetic recording medium for GMR head, the thickness of the magnetic layer is, for example, 50 nm or less, preferably about 30 nm.

With respect to the magnetic recording medium in which the thickness of the magnetic layer is as small as 100 nm or less, a conventional inductive head is poor in reproduction sensitivity, and therefore there is a need to use the MR head or GMR head in the reproduction. In other words, the increase of the magnetization deterioration rate increases the surface density of a recording/reproducing signal, which is a problem in the use of the MR head or GMR head in the reproduction. This phenomenon has not been reported, but a mechanism below is presumed.

The magnetic layer is formed by, for example, depositing a magnetic metal of Co, and the lower portion or upper portion of the magnetic layer is in an oxidation state such that the stoichiometric composition is not established due to a reaction of the magnetic metal with oxygen fed during the deposition or air during the manufacturing steps. The oxidized region is present at the interface between the magnetic layer and the nonmagnetic support or the interface between the magnetic layer and the protective layer.

In a high-temperature high-humidity environment, diffusion of oxygen contained in the magnetic layer or penetration of oxygen and moisture from the external environment is promoted, so that the oxidized region at each interface expands, increasing the oxygen content of the magnetic layer. In the expansion of the oxidized region, the expansion rate is lowered when the oxidized region has a thickness increased-to a certain extent. The reason for this is that, when the thickness of the oxidized film is large, portions of stopping the diffusion paths for oxygen and moisture increase, so that oxygen is difficult to penetrate the magnetic layer. When the thickness of the magnetic layer is 100 nm or more, reduction of the magnetization amount in the center portion of the magnetic layer in the thicknesswise direction is small.

However, when the thickness of the magnetic layer is 100 nm or less, the oxidized region, which expands from the upper portion and the lower portion of the magnetic layer, reaches the center region of the layer, so that whole of the magnetic layer is oxidized. Further, the reaction does not stop until the stoichiometric composition of oxygen and Co is established in the whole of the magnetic layer, and hence the magnetization amount is rapidly reduced.

Figure 4:
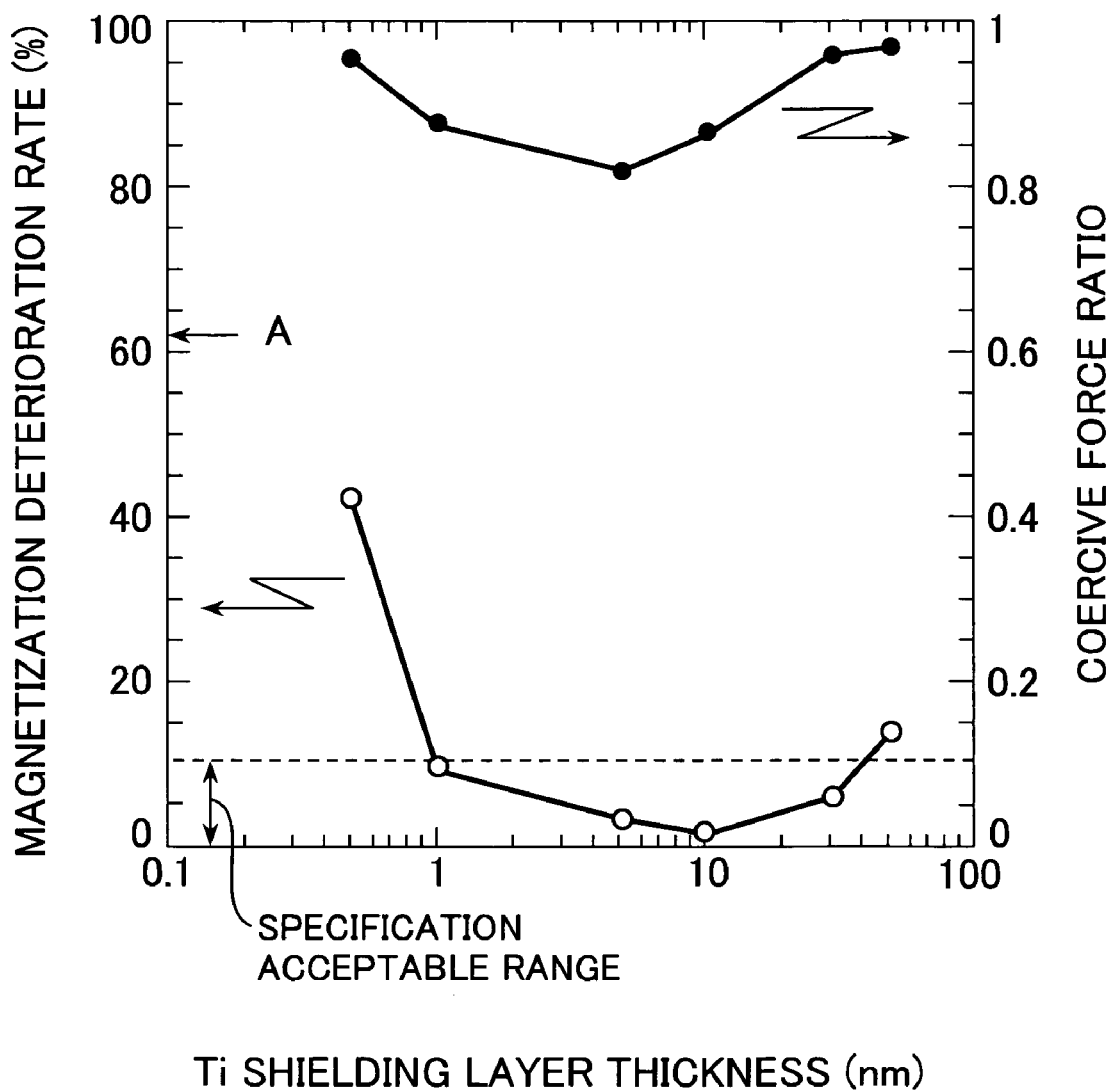
FIG. 4 is a graph showing changes of a magnetization deterioration rate and a coercive force depending on a thickness of a Ti shielding layer.
Figure 5:
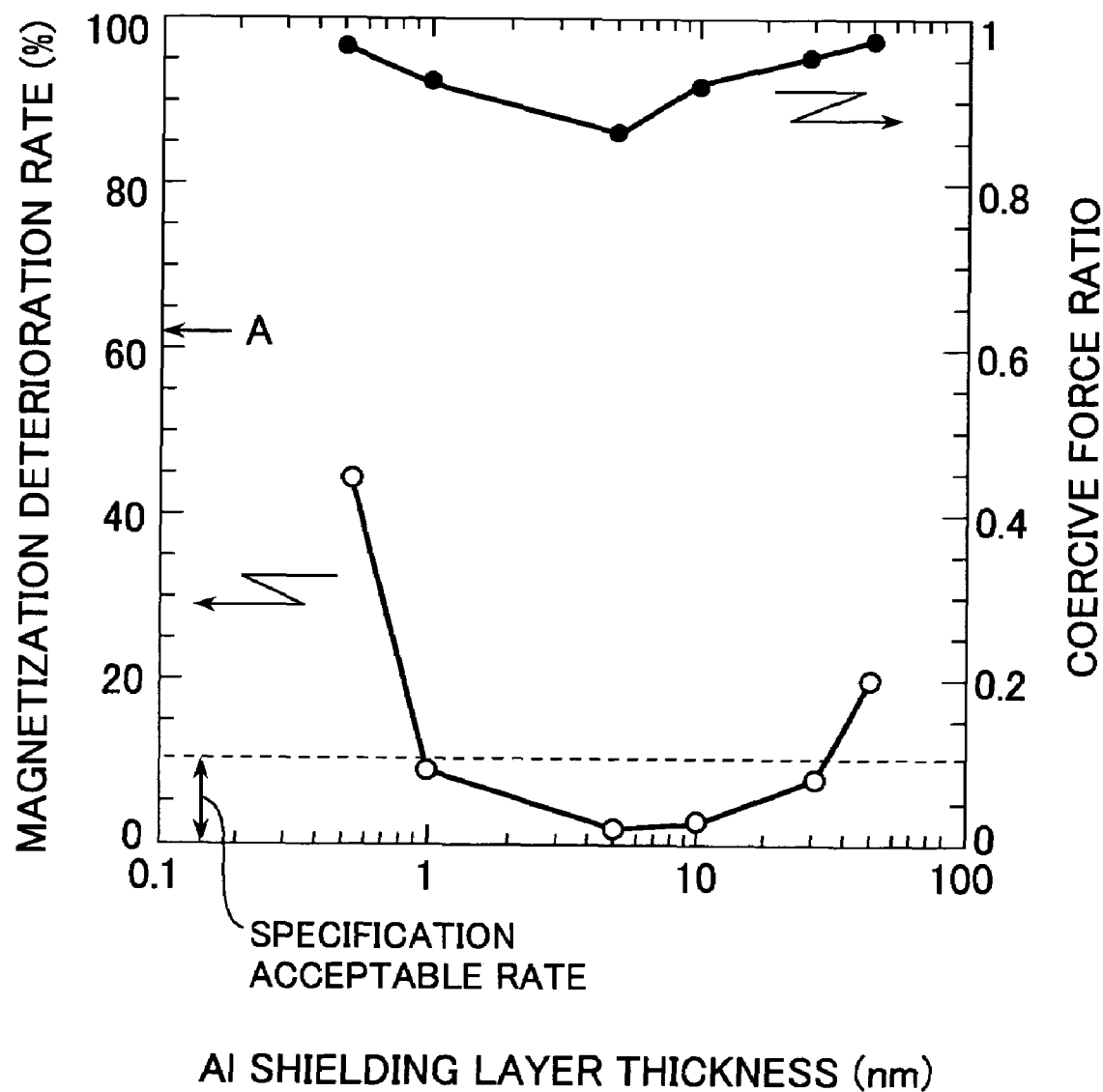
FIG. 5 is a graph showing changes of a magnetization deterioration rate and a coercive force depending on a thickness of an Al shielding layer.

FIG. 4 shows a magnetization deterioration rate and a coercive force ratio of a magnetic recording medium in which a Ti shielding layer is formed at an interface between the nonmagnetic support and the Co magnetic layer. FIG. 5 shows a magnetization deterioration rate and a coercive force ratio of a magnetic recording medium in which an Al shielding layer is formed at an interface between the nonmagnetic support and the Co magnetic layer. The thickness of the magnetic layer is the thickness (25 nm) at which the magnetization deterioration is largest in FIG. 3. The magnetization deterioration rate is determined by making calculation using the formula (1) above. Character A shown in FIGS. 4 and 5 designates a magnetization deterioration rate of a magnetic recording medium in which no shielding layer is formed. The coercive force ratio is determined by making calculation from the coercive force before the storage using the following formula (2).

$$\text{Coercive force ratio} = (\text{Coercive force of a sample})/(\text{Coercive force of a magnetic recording medium having no shielding layer}) \qquad (2)$$

As shown FIGS. 4 and 5, the magnetization deterioration rate of the magnetic recording medium, in which the Ti or Al shielding layer having a thickness of 0.5 nm is formed, is lowered and that of the magnetic recording medium, in which the Ti or Al shielding layer having a thickness of 1 nm is formed, is remarkably lowered, as compared to that of the magnetic recording medium in which no shielding layer is formed. When the thickness of the shielding layer is 5 to 10 nm, the magnetization deterioration rate becomes minimal, and, when the thickness of the shielding layer is more than 10 nm, the magnetization deterioration rate increases.

In the magnetic recording medium for GMR head wherein the specification acceptable range of the magnetization deterioration rate is practically 10% or less, when the thickness of the Ti shielding layer or Al shielding layer is more than 30 nm, the magnetization deterioration rate is not acceptable. In the above related art Patent documents 1 to 3, the undercoating layer is not formed in that thickness range, and hence no studies has been made on the effect of the Ti layer or Al layer having a thickness of 30 nm or less on the magnetic properties or on the behavior of the magnetic properties according to the thickness of the Ti layer or Al layer.

With respect to the coercive force ratio, as shown in FIGS. 4 and 5, the coercive force of the magnetic recording medium, in which the Ti or Al shielding layer having a thickness of 0.5 to 50 nm is formed, is slightly lowered, as compared to that of the magnetic recording medium in which no shielding layer is formed. The coercive force ratio becomes minimal when the thickness of the shielding layer is about 5 nm, and the coercive force ratio in this case is 0.8 or more, which falls in the practically acceptable range.

By forming the Ti or Al shielding layer having a thickness of 1 to 30 nm so as to be in contact with the magnetic layer as described above, reduction of the magnetization amount due to the storage can be effectively suppressed. In addition, also when the shielding layer comprised of an alloy of Ti or Al having the above thickness is formed, it has been confirmed that reduction of the magnetization amount due to the storage can be similarly suppressed.

In the magnetic recording medium described in the Patent document 1, a ratio of the thickness of a metal oxide film formed on the surface of a metal film formed under the magnetic layer to the thickness of the metal film {(thickness of the metal oxide film)/(thickness of the metal film)} is defined to be 0.01 to 0.5.

On the other hand, in the magnetic recording medium of the present invention, even when the thickness of the Ti or Al shielding layer is as small as about 1 nm, the effect to prevent magnetization deterioration of the magnetic layer is obtained. The Ti layer or Al layer is not intentionally subjected to oxidizing treatment, and, even if an oxidized layer is formed due to natural oxidation, the oxidized layer having such a small thickness is difficult to analyze. An effect to reduce Co is observed, and therefore it is considered that Ti or Al constituting the first shielding layer is present in the state of metal which is not oxidized.

EXAMPLES

Hereinbelow, the magnetic recording medium of the present invention will be described with reference to the following specific Examples and Comparative Examples, but the magnetic recording medium of the present invention is not limited to the following Examples.

Experiment A

Example A1

As a nonmagnetic support, a PET film having a thickness of 6.3 µm and a width of 150 mm was prepared. First, on a surface of the nonmagnetic support on which a magnetic layer would be formed, a coating layer having a thickness of 5 nm was formed. The coating layer was formed by applying an aqueous latex comprised mainly of an acrylic ester having dispersed therein silica particles having a diameter of 10 nm so that the density became about $1 \times 10^7$ particles/$mm^2$.

Then, on the nonmagnetic support on which the coating layer was formed, a Ti layer was formed as a first shielding layer. The first shielding layer was deposited by a sputtering process so that the thickness became 1 nm. Subsequently, on the first shielding layer, a Cu layer was formed as a second shielding layer. The second shielding layer was deposited by a sputtering process so that the thickness became 1 nm.

Figure 2:
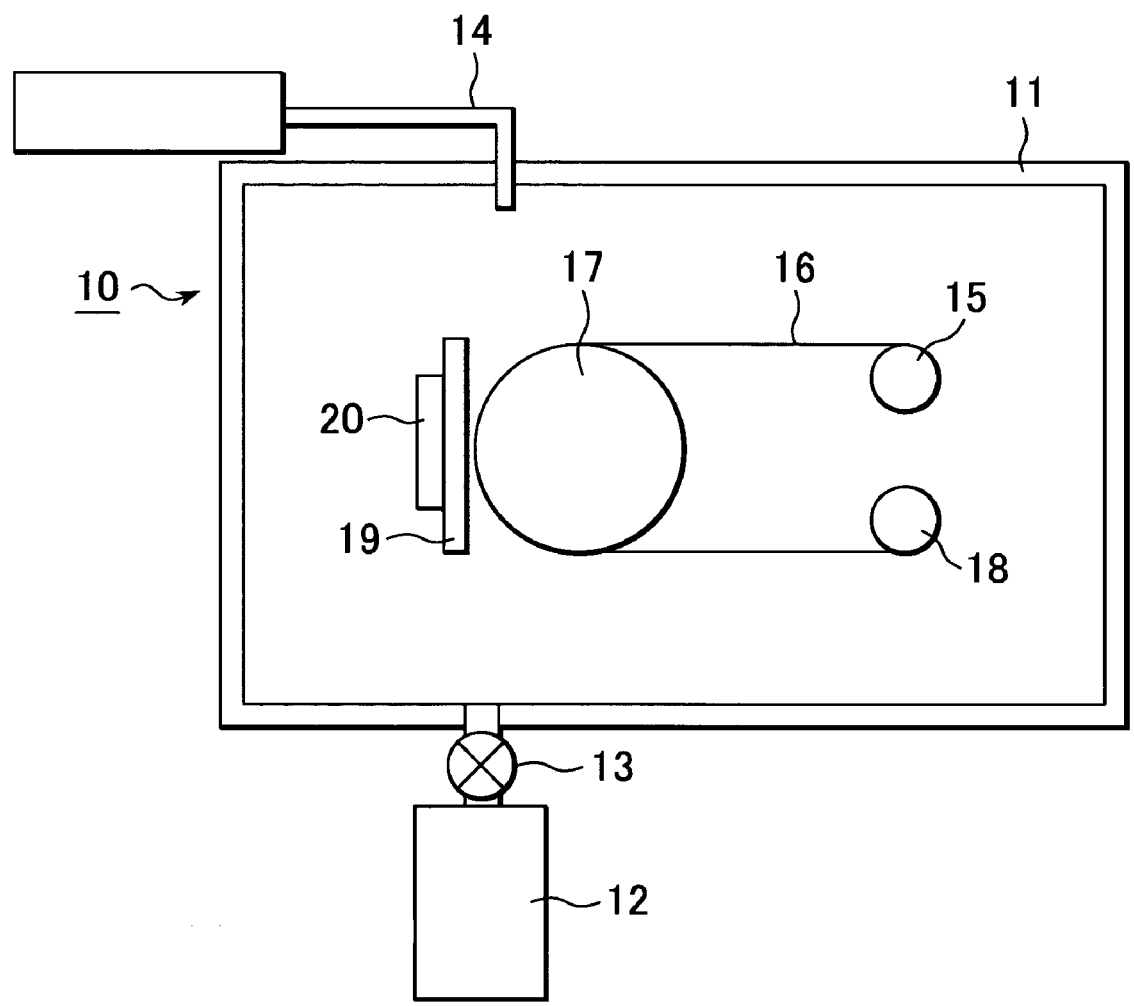
FIG. 2 is a diagrammatic view showing a construction of an apparatus used for forming a shielding layer in a magnetic recording medium of the present invention.

Specifically, in a magnetron sputtering machine 10 shown in FIG. 2, a chamber 11 was provided at a periphery thereof, and the pressure was first reduced to be $10^{-4}$ Pa by means of a vacuum pump 12. Then, an angle of a valve 13 for evaluation toward the vacuum pump 12 was reduced from a full open state to 10° to lower an evacuation rate, and Ar gas was fed from an Ar gas feed pipe 14 to adjust the degree of vacuum to be 0.8 Pa.

Then, a PET film roll 16 was set on an unwinding roll 15, and allowed to travel on a surface of a cooling can 17 cooled to −40° C. so that it was successively wound round a take-up roll 18. A voltage of 3,000 V was applied to an electrode 19, which was disposed at a distance of 45 mm from the cooling can 17 to face the cooling can 17, and a target 20 comprised of Ti or Cu to maintain a state such that a current of 1.4 A flew, so that the Ti layer 3 or the Cu layer 4 as a shielding layer (see FIG. 1) was deposited on a polymer film of the PET film roll 16. The thickness of the shielding layer can be adjusted by changing the deposition rate in each of the Examples and Comparative Examples.

Next, a magnetic layer was formed using a deposition machine. The metal magnetic material as a raw material was Co. Oxygen was fed from an oxygen gas feed pipe at a feed rate of $6.0 \times 10^{-4}$ $m^3$/min, and the raw material was heated by irradiation with an electron beam from an electron gun to deposit a Co—CoO magnetic layer by reactive vacuum deposition. The thickness of the magnetic layer was 50 nm. In this instance, a minimum incident angle and a maximum incident angle of Co deposition particles were adjusted by means of a shutter to be 45° and 90°, respectively.

Then, a protective film comprised of DLC was formed on the magnetic layer by a plasma CVD process so that the thickness became 10 nm. Then, a solution containing perfluoropolyethet was applied onto the protective film comprised of DLC to form a lubricating layer having a thickness of 2 nm.

On a back surface of the nonmagnetic support, for the purpose of improving the running durability, a backcoating layer having a thickness of 0.5 µm was formed. The composition for backcoating was prepared by, using carbon particles having an average particle size of 20 nm as an inorganic pigment, dispersing the carbon particles in a urethane resin and a solvent. In the application of the composition for backcoating, a coating machine employing a direct gravure method was used. Finally, the film roll was cut into 8 mm in width to obtain a sample tape in Example A1.

Example A2

A procedure similar to that in Example A1 was carried out, except that the thickness of the first shielding layer was changed to 10 nm, and that the thickness of the second shielding layer was changed to 40 nm, to prepare a sample tape.

Example A3

A procedure similar to that in Example A1 was carried out, except that the thickness of the first shielding layer was changed to 40 nm, and that the thickness of the second shielding layer was changed to 10 nm, to prepare a sample tape.

Example A4

A procedure similar to that in Example A1 was carried out, except that the thickness of the first shielding layer was changed to 5 nm, and that the thickness of the second shielding layer was changed to 5 nm, to prepare a sample tape.

Example A5

A procedure similar to that in Example A4 was carried out, except that the second shielding layer was changed to a Ni layer, to prepare a sample tape.

Example A6

A procedure similar to that in Example A4 was carried out, except that the second shielding layer was changed to a Cr layer, to prepare a sample tape.

Example A7

A procedure similar to that in Example A1 was carried out, except that the first shielding layer was changed to a Ti—W alloy (50:50) layer having a thickness of 5 nm, and that the second shielding layer was changed to a Cu layer having a thickness of 5 nm, to prepare a sample tape.

Example A8

A procedure similar to that in Example A7 was carried out, except that the second shielding layer was changed to a Cr layer having a thickness of 5 nm, to prepare a sample tape.

Example A9

A procedure similar to that in Example A7 was carried out, except that the second shielding layer was changed to a Ni layer having a thickness of 5 nm, to prepare a sample tape.

Example A10

A procedure similar to that in Example A1 was carried out, except that the first shielding layer was changed to an Al layer having a thickness of 5 nm, and that the second shielding layer was changed to a Cu layer having a thickness of 5 nm, to prepare a sample tape.

Example A11

A procedure similar to that in Example A10 was carried out, except that the second shielding layer was changed to a Cr layer having a thickness of 5 nm, to prepare a sample tape.

Example A12

A procedure similar to that in Example A10 was carried out, except that the second shielding layer was changed to a Ni layer having a thickness of 5 nm, to prepare a sample tape.

Example A13

A procedure similar to that in Example A1 was carried out, except that the first shielding layer was changed to an Al—Si alloy (87:12) layer having a thickness of 5 nm, and that the second shielding layer was changed to a Cu layer having a thickness of 5 nm, to prepare a sample tape.

Example A14

A procedure similar to that in Example A13 was carried out, except that the second shielding layer was changed to a Cr layer having a thickness of 5 nm, to prepare a sample tape.

Example A15

A procedure similar to that in Example A13 was carried out, except that the second shielding layer was changed to a Ni layer having a thickness of 5 nm, to prepare a sample tape.

Example A16

A procedure similar to that in Example A1 was carried out, except that the first shielding layer was changed to a Ti layer having a thickness of 5 nm, and that the second shielding layer was changed to an aluminum oxide layer having a thickness of 5 nm, to prepare a sample tape.

Example A17

A procedure similar to that in Example A16 was carried out, except that the second shielding layer was changed to a silicon oxide layer having a thickness of 5 nm, to prepare a sample tape.

Example A18

A procedure similar to that in Example A16 was carried out, except that the second shielding layer was changed to a silicon nitride layer having a thickness of 5 nm, to prepare a sample tape.

Comparative Example A1

A procedure similar to that in Example A1 was carried out, except that no shielding layer was formed, to prepare a sample tape.

Comparative Example A2

A procedure similar to that in Example A1 was carried out, except that the first shielding layer was changed to a Cu layer having a thickness of 10 nm, and that no second shielding layer was formed, to prepare a sample tape.

Comparative Example A3

A procedure similar to that in Comparative Example A2 was carried out, except that the first shielding layer was changed to a Ni layer having a thickness of 10 nm, to prepare a sample tape.

Comparative Example A4

A procedure similar to that in Comparative Example A2 was repeated, except that the first shielding layer was changed to a Cr layer having a thickness of 10 nm, to prepare a sample tape.

Comparative Example A5

A procedure similar to that in Comparative Example A2 was carried out, except that the first shielding layer was changed to a Ti layer having a thickness of 10 nm, to prepare a sample tape.

Comparative Example A6

A procedure similar to that in Comparative Example A2 was carried out, except that the first shielding layer was changed to a Ti—W alloy (50:50) having a thickness of 10 nm, to prepare a sample tape.

Comparative Example A7

A procedure similar to that in Comparative Example A2 was carried out, except that the first shielding layer was changed to an Al layer having a thickness of 10 nm, to prepare a sample tape.

Comparative Example A8

A procedure similar to that in Comparative Example A2 was carried out, except that the first shielding layer was changed to an Al—Si alloy (87:12) having a thickness of 10 nm, to prepare a sample tape.

Comparative Example A9

A procedure similar to that in Example A1 was carried out, except that the first shielding layer was changed to a Cu layer having a thickness of 5 nm, and that the second shielding layer was changed to a Ti layer having a thickness of 5 nm, to prepare a sample tape.

Comparative Example A10

A procedure similar to that in Comparative Example A9 was carried out, except that the second shielding layer was changed to an Al layer having a thickness of 5 nm, to prepare a sample tape.

Comparative Example A11

A procedure similar to that in Comparative Example A9 was carried out, except that the first shielding layer was changed to a Cr layer having a thickness of 5 nm, to prepare a sample tape.

Comparative Example A12

A procedure similar to that in Comparative Example A9 was carried out, except that the first shielding layer was changed to a Ni layer having a thickness of 5 nm, to prepare a sample tape.

Comparative Example A13

A procedure similar to that in Example A1 was carried out, except that the first shielding layer was changed to a Ti layer having a thickness of 0.5 nm, and that the second shielding layer was changed to a Cu layer having a thickness of 0.5 nm, to prepare a sample tape.

Comparative Example A14

A procedure similar to that in Example A1 was carried out, except that the first shielding layer was changed to a Ti layer having a thickness of 50 nm, and that the second shielding layer was changed to a Cu layer having a thickness of 20 nm, to prepare a sample tape.

With respect to each of the above-prepared sample tapes, using the methods described below, storage properties, magnetic properties, and electromagnetic conversion properties were evaluated. The evaluation ratings for the individual measurements are shown in Table 1 below.

TABLE 1

| Evaluation rating | ◉ | ○ | X |
|---|---|---|---|
| Storage properties A (Magnetization deterioration rate) | 0% ≦ A ≦ 5% | 5% < A ≦ 15% | 15% < A |

TABLE 1-continued

| Evaluation rating | ◉ | ○ | X |
|---|---|---|---|
| Magnetic properties B (Coercive force relative to Comp. Ex. A1) | B ≧ 0.95 | 0.95 > B ≧ 0.90 | 0.90 > B |
| Electromagnetic conversion properties C (C/N relative to Comp. Ex. A1) | C ≧ −1.0 dB | −1.0 dB > C ≧ −1.5 dB | −1.5 dB > C |

The storage properties A shown in the Table 1 above were estimated from a magnetization deterioration rate of the magnetic layer after the storage test. The magnetization deterioration rate was determined by storing a sample tape in an environment at a relative humidity of 90% at a temperature of 65° C. for 6 days and measuring a saturation magnetization $M_{s0}$ of the sample tape before the storage and a saturation magnetization $M_{s1}$ after the storage, and making calculation using the formula (1) below. In the measurement of the saturation magnetization $M_s$, a vibrating sample magnetometer (VSM) was used. The evaluation rating for the storage properties is as follows: ◉: 5% or less; ○: more than 5 and 15% or less; and X: more than 15%.

$$\text{Magnetization deterioration rate (\%)} = \{(M_{s0}-M_{s1})/M_{s0}\} \times 100 \tag{1}$$

As the magnetic properties B shown in the Table 1 above, a coercive force $H_c$ was measured using a VSM, and compared, using the formula (3) below, to the Hc value of the sample tape in Comparative Example A1 having no shielding layer to make evaluation. The evaluation rating for the magnetic properties is as follows: ◉: 0.95 or more; ○: 0.9 or more and less than 0.95; and X: less than 0.9.

$$\text{Magnetic properties ratio} = (\text{Hc value of a sample tape})/(\text{Hc value of Comparative Example A1}) \tag{3}$$

The electromagnetic conversion properties C shown in the Table 1 above were measured using a drum tester. As a head for reproduction, an MR head having a track width of 5 μm was used. A ratio of carrier output to medium noise (C/N ratio) at a recording wavelength of 0.5 μm was determined and evaluated using the value of the sample tape in Comparative Example A1 having no shielding layer as a reference. The evaluation rating for the electromagnetic conversion properties is as follows: ◉: −1.0 dB or more; ○: −1.5 or more and less than −1.0 dB; and X: less than −1.5 dB.

The results of evaluation of the sample tapes in Examples A1 to A18 are shown in Table 2, and the results of evaluation of the sample tapes in Comparative Examples A1 to A14 are shown in Table 3.

TABLE 2

| | Material and thickness of first shielding layer | Material and thickness of second shielding layer | Total thickness (nm) of shielding layers | Storage properties | Magnetic properties | Electromagnetic conversion properties |
|---|---|---|---|---|---|---|
| Ex. A1 | Ti, 1 nm | Cu, 1 nm | 2 | ◉ | ◉ | ◉ |
| Ex. A2 | Ti, 10 nm | Cu, 40 nm | 50 | ◉ | ◉ | ○ |
| Ex. A3 | Ti, 40 nm | Cu, 10 nm | 50 | ◉ | ◉ | ○ |
| Ex. A4 | Ti, 5 nm | Cu, 5 nm | 10 | ◉ | ◉ | ◉ |
| Ex. A5 | Ti, 5 nm | Ni, 5 nm | 10 | ◉ | ○ | ○ |

TABLE 2-continued

| | Material and thickness of first shielding layer | Material and thickness of second shielding layer | Total thickness (nm) of shielding layers | Storage properties | Magnetic properties | Electromagnetic conversion properties |
|---|---|---|---|---|---|---|
| Ex. A6 | Ti, 5 nm | Cr, 5 nm | 10 | ◉ | ◉ | ◉ |
| Ex. A7 | Ti-W alloy, 5 nm | Cu, 5 nm | 10 | ◉ | ◉ | ◉ |
| Ex. A8 | Ti-W alloy, 5 nm | Cr, 5 nm | 10 | ◉ | ◉ | ◉ |
| Ex. A9 | Ti-W alloy, 5 nm | Ni, 5 nm | 10 | ◉ | ○ | ○ |
| Ex. A10 | Al, 5 nm | Cu, 5 nm | 10 | ◉ | ◉ | ◉ |
| Ex. A11 | Al, 5 nm | Cr, 5 nm | 10 | ◉ | ◉ | ◉ |
| Ex. A12 | Al, 5 nm | Ni, 5 nm | 10 | ◉ | ○ | ○ |
| Ex. A13 | Al-Si alloy, 5 nm | Cu, 5 nm | 10 | ◉ | ◉ | ◉ |
| Ex. A14 | Al-Si alloy, 5 nm | Cr, 5 nm | 10 | ◉ | ◉ | ◉ |
| Ex. A15 | Al-Si alloy, 5 nm | Ni, 5 nm | 10 | ◉ | ○ | ○ |
| Ex. A16 | Ti, 5 nm | Aluminum oxide, 5 nm | 10 | ◉ | ○ | ○ |
| Ex. A17 | Ti, 5 nm | Silicon oxide, 5 nm | 10 | ◉ | ○ | ○ |
| Ex. A18 | Ti, 6 nm | Silicon nitride, 5 nm | 10 | ◉ | ○ | ○ |

TABLE 3

| | Material and thickness of first shielding layer | Material and thickness of second shielding layer | Total thickness (nm) of shielding layers | Storage properties | Magnetic properties | Electromagnetic conversion properties |
|---|---|---|---|---|---|---|
| Comp. Ex. A1 | None | None | 0 | X | ◉ (Reference) | ◉ (Reference) |
| Comp. Ex. A2 | Cu, 10 nm | None | 10 | X | ◉ | ◉ |
| Comp. Ex. A3 | Ni, 10 nm | None | 10 | X | ○ | ○ |
| Comp. Ex. A4 | Cr, 10 nm | None | 10 | X | ◉ | ◉ |
| Comp. Ex. A5 | Ti, 10 nm | None | 10 | ◉ | X | X |
| Comp. Ex. A6 | Ti-W alloy, 10 nm | None | 10 | ◉ | X | X |
| Comp. Ex. A7 | Al, 10 nm | None | 10 | ◉ | X | X |
| Comp. Ex. A8 | Al-Si alloy, 10 nm | None | 10 | ◉ | X | X |
| Comp. Ex. A9 | Cu, 5 nm | Ti, 5 nm | 10 | ◉ | X | X |
| Comp. Ex. A10 | Cu, 5 nm | Al, 5 nm | 10 | ◉ | X | X |
| Comp. Ex. A11 | Cr, 5 nm | Ti, 5 nm | 10 | ◉ | X | X |
| Comp. Ex. A12 | Ni, 5 nm | Ti, 5 nm | 10 | ◉ | X | X |

TABLE 3-continued

| | Material and thickness of first shielding layer | Material and thickness of second shielding layer | Total thickness (nm) of shielding layers | Storage properties | Magnetic properties | Electromagnetic conversion properties |
|---|---|---|---|---|---|---|
| Comp. Ex. A13 | Ti, 0.5 nm | Cu, 0.5 nm | 1 | X | ⊚ | ⊚ |
| Comp. Ex. A14 | Ti, 50 nm | Cu, 20 nm | 70 | ○ | ⊚ | X |

Examples A1 to A15 are examples in which the first shielding layer is comprised of Ti or Al, or an alloy of any one of them and the second shielding layer is comprised of Cu, Ni, or Cr. In a case where the shielding layers of a double-layer structure in this configuration were formed, the storage properties were remarkably improved and no deterioration of the magnetic properties and electromagnetic conversion properties occurred.

To Examples A1 to A4 and Comparative Examples A13 and A14, it is common that the first shielding layer is a Ti layer and the second shielding layer is a Cu layer, and the two shielding layers individually have different thickness. Examples A1 to A4 are examples in which the total thickness of the shielding layers is 2 to 50 nm. On the other hand, Comparative Example A13 is an example in which the total thickness of the shielding layers is 1 nm, and Comparative Example A14 is an example in which the total thickness of the shielding layers is 70 nm.

In Examples A1 to A4, the storage properties, magnetic properties, and electromagnetic conversion properties were excellent. By contrast, in Comparative Example A13, lowering of the storage properties was observed, and, in Comparative Example A14, lowering of the electromagnetic conversion properties was observed. Specifically, in the case where the total thickness of the two shielding layers was 2 to 50 nm, deterioration of the magnetic layer was prevented by the two shielding layers. In the case where the total thickness was smaller than 2 nm (Comparative Example A13), the results were similar to those of the sample tape having no shielding layer (Comparative Example A1), indicating that the stacked film of the Ti layer and Cu layer did not function as a shielding layer.

On the other hand, in the case where the total thickness of the two shielding layers was more than 50 nm (Comparative Example A14), the storage properties were improved, but the electromagnetic conversion properties deteriorated. The reason for this is presumed that the shielding layers having an increased thickness roughen the surface of the magnetic layer. The phenomenon in which the surface of the magnetic layer is roughened if the thickness of the shielding layers is increased can be confirmed by, for example, examination under a scanning electron microscope (SEM).

Examples A16 to A18 are examples in which the first shielding layer is a Ti layer and the second shielding layer is comprised of aluminum oxide, silicon oxide, or silicon nitride. When the second shielding layer is formed from an oxide or nitride having high density, the storage properties are remarkably improved and deterioration of the magnetic properties and electromagnetic conversion properties can be suppressed.

Comparative Example A1 is an example in which no shielding layer is formed, and the storage properties are not at a desired level. Comparative Examples A2 to A4 are examples in which the shielding layer of a single layer comprised of Cu, Ni, or Cr is formed, and the storage properties are not improved. Comparative Examples A5 to A8 are examples in which the shielding layer is comprised of Ti or Al or an alloy of any one of them, and the storage properties are remarkably improved, but the magnetic properties and the electromagnetic conversion properties deteriorate.

Comparative Examples A9 to A12 are examples in which the material for the first shielding layer is Cu, Ni, or Cr and the material for the second shielding layer is Ti or Al. Comparative Example A9 corresponds to an example in which the first shielding layer and the second shielding layer in Example A4 are switched. The materials for and the thickness of the individual shielding layers are common to Comparative Example A9 and Example A4. Similarly, Comparative Example A10 and Example A10 are different only in the configuration of the two shielding layers. Comparative Example A11 and Example A6 are different only in the configuration of the two shielding layers. Comparative Example A12 and Example A5 are different only in the configuration of the two shielding layers.

In Examples A4 to A6 and A10, excellent results were obtained, whereas, in Comparative Examples A9 to A12, only the storage properties were excellent and the magnetic properties and the electromagnetic conversion properties deteriorated. From this, it is found that not only the materials for and the thickness of the individual shielding layers but also the configuration of the two shielding layers affect the function of the shielding layer.

Figure 6:
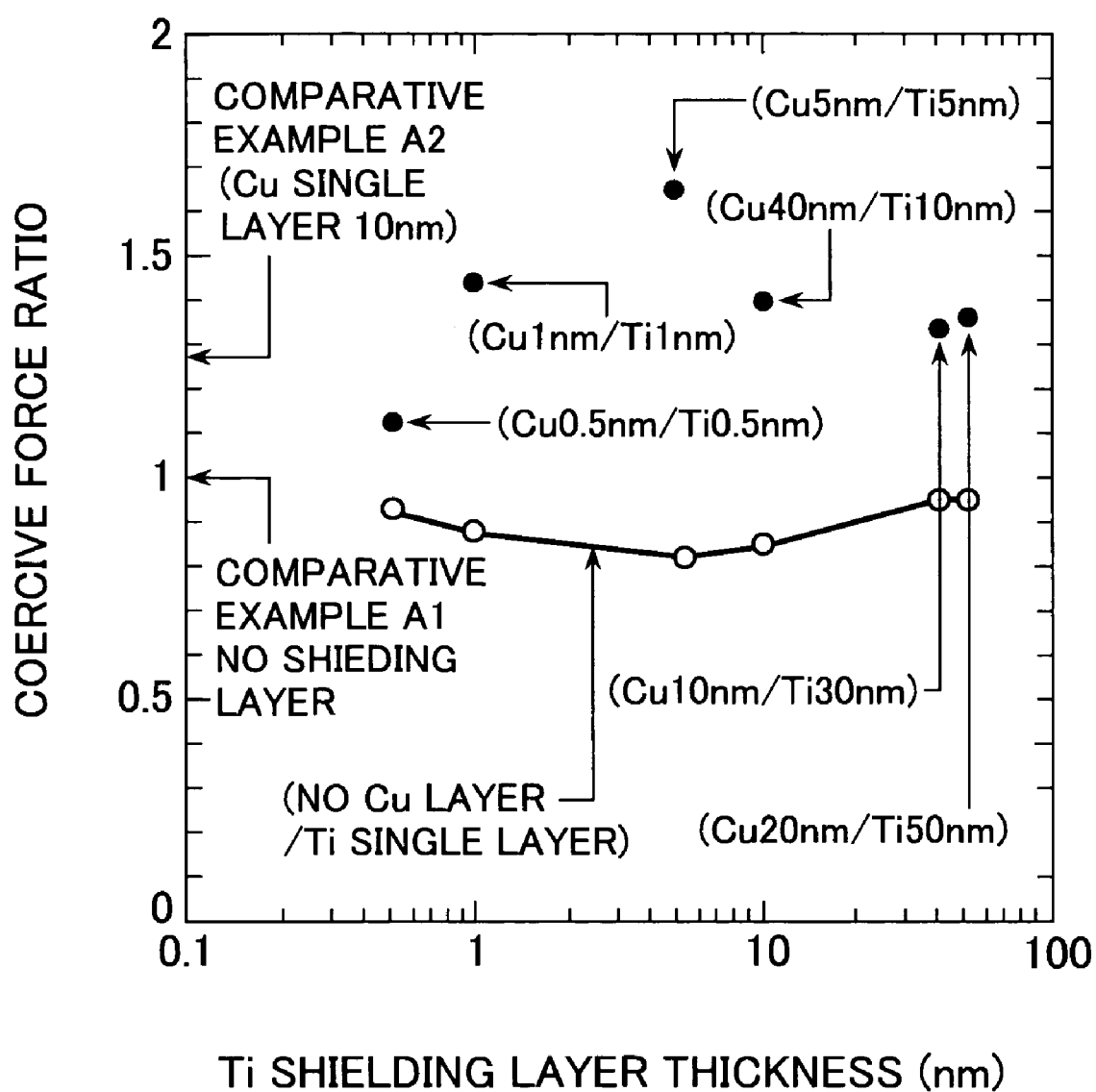
FIG. 6 is a graph showing a coercive force ratio with respect to the magnetic recording media in the Examples of the present invention and Comparative Examples, in which s thickness of a Ti shielding layer and/or s thickness of a Cu shielding layer is changed.

With respect to the coercive force, the patent document 3 has a description showing that the coercive force is increased when an Al layer is formed as an undercoat for the magnetic layer. However, in a case where a Ti layer of a single layer having a thickness in the range of the thickness of the shielding layer defined in the magnetic recording medium of the present invention is formed, as shown in FIG. 6, the coercive force is lowered, as compared to the magnetic recording medium having no shielding layer (Comparative Example A1). It is noted that FIG. 6 shows an increasing tendency of the coercive force as the thickness of the shielding layer of a single layer increases. Therefore, the phenomenon in which formation of the shielding layer lowers the coercive force is considered to occur when the shielding layer has an extremely small thickness.

For preventing lowering of the surface properties due to an increase of the thickness of the shielding layer to suppress the increase of a medium noise, it is important to reduce the thickness of the shielding layer. In the magnetic recording medium of the present invention, the shielding layer formed as an undercoat for the magnetic layer is thin, and hence high C/N can be obtained.

In addition, as shown in FIG. 6, the coercive force of the magnetic recording medium in which a Cu layer of a single layer was formed (Comparative Example A2) was increased, as compared to that of the magnetic recording medium in which no shielding layer was formed (Comparative Example A1). In FIG. 6, "(Cu X nm/Ti Y nm)" indicates that a Cu layer having a thickness of X nm is formed on a Ti layer having a thickness of Y nm. As shown in FIG. 6, the coercive force of the magnetic recording medium in which a Cu layer having a thickness of 10 nm or less is formed on a Ti layer having a thickness of 10 nm or less is very large, as compared to that of the magnetic recording medium in which a Cu layer of a single layer is formed. In a case where the Ti layer was changed to an Al layer, a similar tendency was observed.

Figure 7:
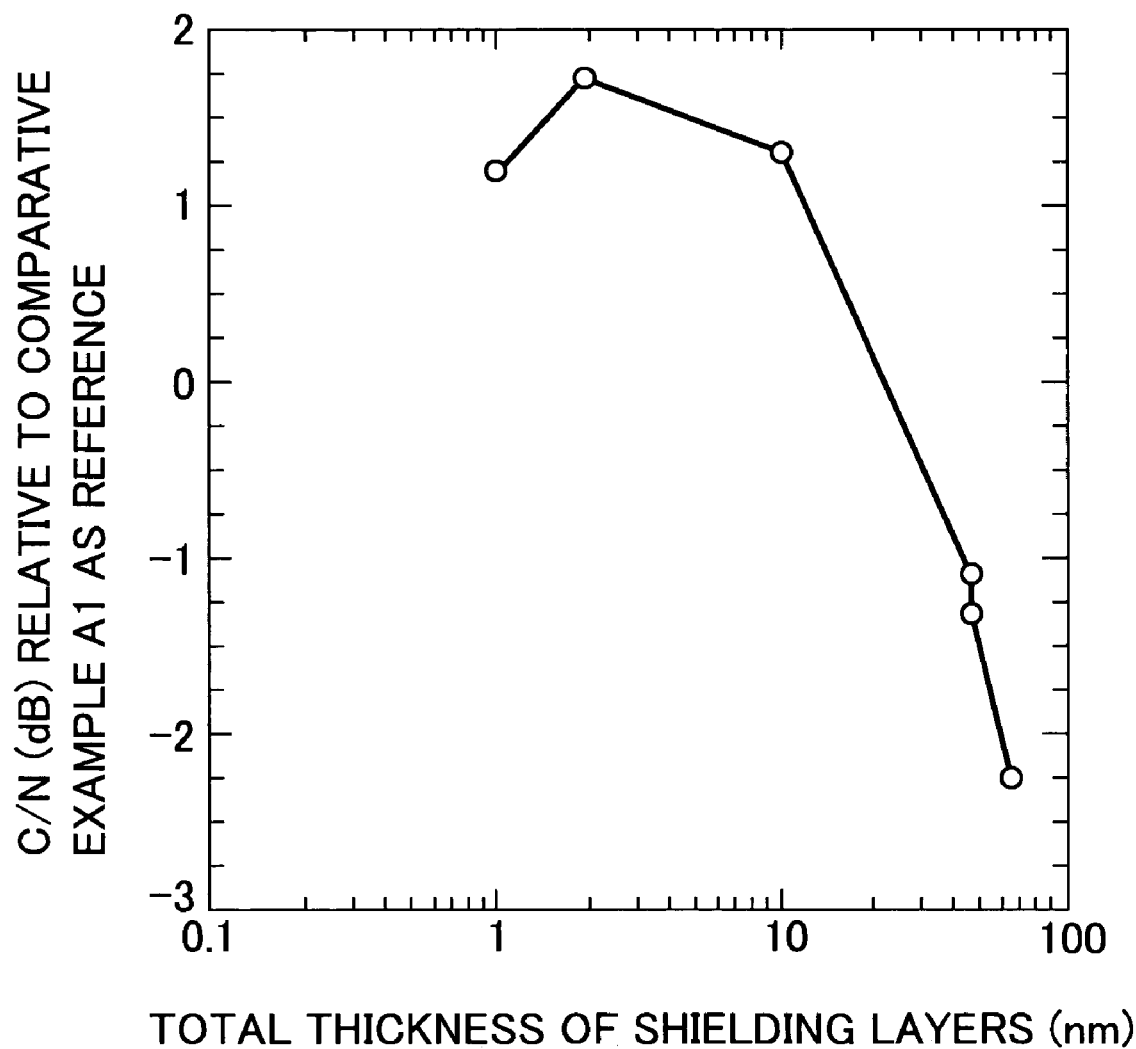
FIG. 7 is a graph showing a C/N with respect to the magnetic recording media in the Examples of the present invention, in which a total thickness of the shielding layers is changed.

FIG. 7 shows the relationship between the total thickness of the first and second shielding layers and C/N in a case where a Ti layer is formed as the first shielding layer and a Cu layer is formed as the second shielding layer. A shielding layer total thickness of 1 nm corresponds to Comparative Example A13, a shielding layer total thickness of 2 nm corresponds to Example A1, a shielding layer total thickness of 10 nm corresponds to Example A4, a shielding layer total thickness of 50 nm corresponds to Examples A2 and A3, and a shielding layer total thickness of 70 nm corresponds to Comparative Example A14.

As can be seen from FIG. 7, when the total thickness of the two shielding layers, i.e., the Ti layer and the Cu layer is 1 to 10 nm and Comparative Example A1 is taken as a reference (0 dB), the C/N is improved. Generally, the higher the coercive force, the more excellent the C/N. When the total thickness of the shielding layers is 50 nm or more, it is expected that the coercive force is high and the C/N is excellent as shown in FIG. 6, but, actually, the C/N rapidly became poor when the total thickness of the shielding layers exceeded 10 nm.

The reason for this is presumed that the increase of the thickness of the shielding layer roughens the surface of the shielding layer to increase a noise. In a system using a GMR head, recording and reproduction are conducted at a wavelength shorter than those conventionally used, and therefore the roughened surface of the layer is sensitively reflected in the amount of a noise.

In this case, a practically acceptable range of C/N is −1.5 dB or more, and the C/N obtained in a case where the total thickness of the shielding layers is 50 nm is not acceptable. Specifically, in the magnetic recording medium in which the thickness of the magnetic layer was 55 nm or less, in a case where the total thickness of the shielding layers was more than 50 nm, the electromagnetic conversion properties were poor. On the other hand, when the total thickness of the shielding layers was 1 nm or less, magnetization deterioration due to the storage was marked and the storage properties were poor.

Experiment B

Procedures similar to those in Experiment A were carried out, except that the Cu layer constituting the first shielding layer or the second shielding layer was changed to an Ag layer, to prepare magnetic tapes as samples.

Example B1

A procedure similar to that in Example A1 was carried out, except that an Ag layer having a thickness of 1 nm was formed as the second shielding layer, to prepare a sample tape.

Example B2

A procedure similar to that in Example A1 was carried out, except that the thickness of the first shielding layer was changed to 10 nm, and that the second shielding layer was changed to an Ag layer having a thickness of 40 nm, to prepare a sample tape.

Example B3

A procedure similar to that in Example A1 was carried out, except that the thickness of the first shielding layer was changed to 40 nm, and that the second shielding layer was changed to an Ag layer having a thickness of 10 nm, to prepare a sample tape.

Example B4

A procedure similar to that in Example A1 was carried out, except that the thickness of the first shielding layer was changed to 5 nm, and that the second shielding layer was changed to an Ag layer having a thickness of 5 nm, to prepare a sample tape.

Example B5

A procedure similar to that in Example A1 was carried out, except that the first shielding layer was changed to a Ti—W alloy (50:50) layer having a thickness of 5 nm, and that the second shielding layer was changed to an Ag layer having a thickness of 5 nm, to prepare a sample tape.

Example B6

A procedure similar to that in Example A1 was carried out, except that the first shielding layer was changed to an Al layer having a thickness of 5 nm, and that the second shielding layer was changed to an Ag layer having a thickness of 5 nm, to prepare a sample tape.

Example B7

A procedure similar to that in Example A1 was repeated, except that the first shielding layer was changed to an Al—Si alloy (87:12) layer having a thickness of 5 nm, and that the second shielding layer was changed to an Ag layer having a thickness of 5 nm, to prepare a sample tape.

Comparative Example B1

A procedure similar to that in Example A1 was carried out, except that the first shielding layer was changed to an Ag layer having a thickness of 10 nm, and that no second shielding layer was formed, to prepare a sample tape.

Comparative Example B2

A procedure similar to that in Example A1 was carried out, except that the first shielding layer was changed to an Ag layer having a thickness of 5 nm, and that the second shielding layer was changed to a Ti layer having a thickness of 5 nm, to prepare a sample tape.

Comparative Example B3

A procedure similar to that in Example A1 was carried out, except that the first shielding layer was changed to an Ag layer having a thickness of 5 nm, and that the second shielding layer was changed to an Al layer having a thickness of 5 nm, to prepare a sample tape.

Comparative Example B4

A procedure similar to that in Example A1 was carried out, except that the first shielding layer was changed to a Ti layer having a thickness of 0.5 nm, and that the second shielding layer was changed to an Ag layer having a thickness of 0.5 nm, to prepare a sample tape.

Comparative Example B5

A procedure similar to that in Example A1 was carried out, except that the first shielding layer was changed to a Ti layer having a thickness of 50 nm, and that the second shielding layer was changed to an Ag layer having a thickness of 20 nm, to prepare a sample tape.

With respect to each of the above-prepared sample tapes in Examples B1 to B7 and Comparative Examples B1 to B5, storage properties, magnetic properties, and electromagnetic conversion properties were evaluated. The evaluation ratings for the individual measurements are as shown in the Table 1 above.

The results of evaluation of the sample tapes in Examples B1 to B7 and Comparative Examples B1 to B5 are shown in Tables 4 and 5 below.

Examples B1 to B7 are examples in which the first shielding layer is comprised of Ti or Al, or an alloy of any one of them and the second shielding layer is comprised of Ag. In a case where the shielding layers of a double-layer structure in this configuration were formed, the storage properties were remarkably improved and no deterioration of the magnetic properties and electromagnetic conversion properties occurred.

Among Examples B1 to B4 and Comparative Examples B4 and B5, it is common that the first shielding layer is a Ti layer and the second shielding layer is an Ag layer, and the two shielding layers individually have different thickness.

Examples B1 to B4 are examples in which the total thickness of the shielding layers is 2 to 50 nm. On the other hand, Comparative Example B4 is an example in which the total thickness of the shielding layers is 1 nm, and Comparative Example B5 is an example in which the total thickness of the shielding layers is 70 nm.

In Examples B1 to B4, the storage properties, magnetic properties, and electromagnetic conversion properties were excellent. By contrast, in Comparative Example B4, lowering of the storage properties was observed, and, in Comparative Example B5, lowering of the electromagnetic conversion properties was observed.

Specifically, when the total thickness of the two shielding layers was 2 to 50 nm, deterioration of the magnetic layer was prevented by the two shielding layers. In a case where the total thickness was smaller than 2 nm (Comparative Example B4), the results were similar to those of the sample tape having no shielding layer (Comparative Example A1 in

TABLE 4

|  | Material and thickness of first shielding layer | Material and thickness of second shielding layer | Total thickness (nm) of shielding layers | Storage properties | Magnetic properties | Electromagnetic conversion properties |
| --- | --- | --- | --- | --- | --- | --- |
| Ex. B1 | Ti, 1 nm | Ag, 1 nm | 2 | ⊚ | ⊚ | ⊚ |
| Ex. B2 | Ti, 10 nm | Ag, 40 nm | 50 | ⊚ | ⊚ | ○ |
| Ex. B3 | Ti, 40 nm | Ag, 10 nm | 50 | ⊚ | ⊚ | ○ |
| Ex. B4 | Ti, 5 nm | Ag, 5 nm | 10 | ⊚ | ⊚ | ⊚ |
| Ex. B5 | Ti-W alloy, 5 nm | Ag, 5 nm | 10 | ⊚ | ⊚ | ⊚ |
| Ex. B6 | Al, 5 nm | Ag, 5 nm | 10 | ⊚ | ⊚ | ⊚ |
| Ex. B7 | Al-Si alloy, 5 nm | Ag, 5 nm | 10 | ⊚ | ⊚ | ⊚ |

TABLE 5

|  | Material and thickness of first shielding layer | Material and thickness of second shielding layer | Total thickness (nm) of shielding layers | Storage properties | Magnetic properties | Electromagnetic conversion properties |
| --- | --- | --- | --- | --- | --- | --- |
| Comp. Ex. B1 | Ag, 10 nm | None | 10 | X | ⊚ | ⊚ |
| Comp. Ex. B2 | Ag, 5 nm | Ti, 5 nm | 10 | ⊚ | X | X |
| Comp. Ex. B3 | Ag, 5 nm | Al, 5 nm | 10 | ⊚ | X | X |
| Comp. Ex. B4 | Ti, 0.5 nm | Ag, 0.5 nm | 1 | X | ⊚ | ⊚ |
| Comp. Ex. B5 | Ti, 50 nm | Ag, 20 nm | 70 | ○ | ⊚ | X |

Experiment A), indicating that the stacked film of the Ti layer and Ag layer did not function as a shielding layer.

On the other hand, in a case where the total thickness of the two shielding layers was more than 50 nm (Comparative Example B5), the storage properties were improved, but the electromagnetic conversion properties deteriorated. The reason for this is presumed that the shielding layers having an increased thickness roughen the surface of the magnetic layer. The phenomenon in which the surface of the magnetic layer is roughened when the thickness of the shielding layers is increased can be confirmed by, for example, examination under a scanning electron microscope (SEM).

Comparative Examples B2 and B3 are examples in which the material for the first shielding layer is Ag and the material for the second shielding layer is Ti or Al. Comparative Example B2 corresponds to an example in which the first shielding layer and the second shielding layer in Example B4 are switched. The materials for and the thickness of the individual shielding layers are common to Comparative Example B2 and Example B4. Similarly, Comparative Example B3 and Example B6 are different only in the configuration of the two shielding layers.

In Examples B4 and B6, excellent results were obtained, whereas, in Comparative Examples B2 and B3, only the storage properties were excellent and the magnetic properties and the electromagnetic conversion properties deteriorated. From this, it is apparent that not only the materials for and the thickness of the individual shielding layers but also the configuration of the two shielding layers affect the function of the shielding layer.

Experiment C

Procedures similar to those in Experiment A were carried out, except that the Cu layer constituting the first shielding layer or the second shielding layer was changed to an Au layer, to prepare magnetic tapes as samples.

Example C1

A procedure similar to that in Example A1 was carried out, except that an Au layer having a thickness of 1 nm was formed as the second shielding layer, to prepare a sample tape.

Example C2

A procedure similar to that in Example A1 was carried out, except that the thickness of the first shielding layer was changed to 10 nm, and that the second shielding layer was changed to an Au layer having a thickness of 40 nm, to prepare a sample tape.

Example C3

A procedure similar to that in Example A1 was carried out, except that the thickness of the first shielding layer was changed to 40 nm, and that the second shielding layer was changed to an Au layer having a thickness of 10 nm, to prepare a sample tape.

Example C4

A procedure similar to that in Example A1 was carried out, except that the thickness of the first shielding layer was changed to 5 nm, and that the second shielding layer was changed to an Au layer having a thickness of 5 nm, to prepare a sample tape.

Example C5

A procedure similar to that in Example A1 was carried out, except that the first shielding layer was changed to a Ti—W alloy (50:50) layer having a thickness of 5 nm, and that the second shielding layer was changed to an Au layer having a thickness of 5 nm, to prepare a sample tape.

Example C6

A procedure similar to that in Example A1 was carried out, except that the first shielding layer was changed to an Al layer having a thickness of 5 nm, and that the second shielding layer was changed to an Au layer having a thickness of 5 nm, to prepare a sample tape.

Example C7

A procedure similar to that in Example A1 was carried out, except that the first shielding layer was changed to an Al—Si alloy (87:12) layer having a thickness of 5 nm, and that the second shielding layer was changed to an Au layer having a thickness of 5 nm, to prepare a sample tape.

Comparative Example C1

A procedure similar to that in Example A1 was carried out, except that the first shielding layer was changed to an Au layer having a thickness of 10 nm, and that no second shielding layer was formed, to prepare a sample tape.

Comparative Example C2

A procedure similar to that in Example A1 was carried out, except that the first shielding layer was changed to an Au layer having a thickness of 5 nm, and that the second shielding layer was changed to a Ti layer having a thickness of 5 nm, to prepare a sample tape.

Comparative Example C3

A procedure similar to that in Example A1 was carried out, except that the first shielding layer was changed to an Au layer having a thickness of 5 nm, and that the second shielding layer was changed to an Al layer having a thickness of 5 nm, to prepare a sample tape.

Comparative Example C4

A procedure similar to that in Example A1 was carried out, except that the first shielding layer was changed to a Ti layer having a thickness of 0.5 nm, and that the second shielding layer was changed to an Au layer having a thickness of 0.5 nm, to prepare a sample tape.

Comparative Example C5

A procedure similar to that in Example A1 was carried out, except that the first shielding layer was changed to a Ti layer having a thickness of 50 nm, and that the second shielding layer was changed to an Au layer having a thickness of 20 nm, to prepare a sample tape.

With respect to each of the above-prepared sample tapes in Examples C1 to C7 and Comparative Examples C1 to C5, storage properties, magnetic properties, and electromagnetic conversion properties were evaluated. The evaluation ratings for the individual measurements are as shown in the Table 1 above.

The results of evaluation of the sample tapes in Examples C1 to C7 and Comparative Examples C1 to C5 are shown in Tables 6 and 7 below.

TABLE 6

|  | Material and thickness of first shielding layer | Material and thickness of second shielding layer | Total thickness (nm) of shielding layers | Storage properties | Magnetic properties | Electromagnetic conversion properties |
|---|---|---|---|---|---|---|
| Ex. C1 | Ti, 1 nm | Au, 1 nm | 2 | ⊚ | ⊚ | ⊚ |
| Ex. C2 | Ti, 10 nm | Au, 40 nm | 50 | ⊚ | ⊚ | ○ |
| Ex. C3 | Ti, 40 nm | Au, 10 nm | 50 | ⊚ | ⊚ | ○ |
| Ex. C4 | Ti, 5 nm | Au, 5 nm | 10 | ⊚ | ⊚ | ⊚ |
| Ex. C5 | Ti-W alloy, 5 nm | Au, 5 nm | 10 | ⊚ | ⊚ | ⊚ |
| Ex. C6 | Al, 5 nm | Au, 5 nm | 10 | ⊚ | ⊚ | ⊚ |
| Ex. C7 | Al-Si alloy, 5 nm | Au, 5 nm | 10 | ⊚ | ⊚ | ⊚ |

TABLE 7

|  | Material and thickness of first shielding layer | Material and thickness of second shielding layer | Total thickness (nm) of shielding layers | Storage properties | Magnetic properties | Electromagnetic conversion properties |
|---|---|---|---|---|---|---|
| Comp. Ex. C1 | Au, 10 nm | None | 10 | X | ⊚ | ⊚ |
| Comp. Ex. C2 | Au, 5 nm | Ti, 5 nm | 10 | ⊚ | X | X |
| Comp. Ex. C3 | Au, 5 nm | Al, 5 nm | 10 | ⊚ | X | X |
| Comp. Ex. C4 | Ti, 0.5 nm | Au, 0.5 nm | 1 | X | ⊚ | ⊚ |
| Comp. Ex. C5 | Ti, 50 nm | Au, 20 nm | 70 | ○ | ⊚ | X |

Examples C1 to C7 are examples in which the first shielding layer is comprised of Ti or Al, or an alloy of any one of them and the second shielding layer is comprised of Au. In a case where the shielding layers of a double-layer structure in this configuration were formed, the storage properties were remarkably improved and no deterioration of the magnetic properties and electromagnetic conversion properties occurred.

Among Examples C1 to C4 and Comparative Examples C4 and C5, it is common that the first shielding layer is a Ti layer and the second shielding layer is an Au layer, and the two shielding layers individually have different thickness. Examples C1 to C4 are examples in which the total thickness of the shielding layers is 2 to 50 nm. On the other hand, Comparative Example C4 is an example in which the total thickness of the shielding layers is 1 nm, and Comparative Example C5 is an example in which the total thickness of the shielding layers is 70 nm.

In Examples C1 to C4, the storage properties, magnetic properties, and electromagnetic conversion properties were excellent. By contrast, in Comparative Example C4, lowering of the storage properties was observed, and, in Comparative Example C5, lowering of the electromagnetic conversion properties was observed.

Specifically, in the case where the total thickness of the two shielding layers was 2 to 50 nm, deterioration of the magnetic layer was prevented by the two shielding layers. In the case where the total thickness was smaller than 2 nm (Comparative Example C4), the results were similar to those of the sample tape having no shielding layer (Comparative Example A1 in Experiment A), indicating that the stacked film of the Ti layer and Au layer did not function as a shielding layer.

On the other hand, in the case where the total thickness of the two shielding layers was more than 50 nm (Comparative Example C5), the storage properties were improved, but the electromagnetic conversion properties deteriorated. The reason for this is presumed that the shielding layers having an increased thickness roughen the surface of the magnetic layer. The phenomenon in which the surface of the magnetic layer is roughened if the thickness of the shielding layers is increased can be confirmed by, for example, examination under a scanning electron microscope (SEM).

Comparative Examples C2 and C3 are examples in which the material for the first shielding layer is Au and the material for the second shielding layer is Ti or Al. Comparative Example C2 corresponds to an example in which the first shielding layer and the second shielding layer in Example C4 are switched. The materials for and the thickness of the individual shielding layers are common to Comparative Example C2 and Example C4. Similarly, Comparative Example C3 and Example C6 are different only in the configuration of the two shielding layers.

In Examples C4 and C6, excellent results were obtained, whereas, in Comparative Examples C2 and C3, only the storage properties were excellent and the magnetic properties and the electromagnetic conversion properties deteriorated. From this, it is apparent that not only the materials for and the thickness of the individual shielding layers but also the configuration of the two shielding layers affect the function of the shielding layer.

Experiment D

Procedures similar to those in Experiment A were carried out, except that the Cu layer constituting the first shielding layer or the second shielding layer was changed to a Pd layer, to prepare magnetic tapes as samples.

Example D1

A procedure similar to that in Example A1 was carried out, except that a Pd layer having a thickness of 1 nm was formed as the second shielding layer, to prepare a sample tape.

Example D2

A procedure similar to that in Example A1 was carried out, except that the thickness of the first shielding layer was changed to 10 nm, and that the second shielding layer was changed to a Pd layer having a thickness of 40 nm, to prepare a sample tape.

Example D3

A procedure similar to that in Example A1 was carried out, except that the thickness of the first shielding layer was changed to 40 nm, and that the second shielding layer was changed to a Pd layer having a thickness of 10 nm, to prepare a sample tape.

Example D4

A procedure similar to that in Example A1 was carried out, except that the thickness of the first shielding layer was changed to 5 nm, and that the second shielding layer was changed to a Pd layer having a thickness of 5 nm, to prepare a sample tape.

Example D5

A procedure similar to that in Example A1 was repeated, except that the first shielding layer was changed to a Ti—W alloy (50:50) layer having a thickness of 5 nm, and that the second shielding layer was changed to a Pd layer having a thickness of 5 nm, to prepare a sample tape.

Example D6

A procedure similar to that in Example A1 was repeated, except that the first shielding layer was changed to an Al layer having a thickness of 5 nm, and that the second shielding layer was changed to a Pd layer having a thickness of 5 nm, to prepare a sample tape.

Example D7

A procedure similar to that in Example A1 was carried out, except that the first shielding layer was changed to an Al—Si alloy (87:12) layer having a thickness of 5 nm, and that the second shielding layer was changed to a Pd layer having a thickness of 5 nm, to prepare a sample tape.

Comparative Example D1

A procedure similar to that in Example A1 was carried out, except that the first shielding layer was changed to a Pd layer having a thickness of 10 nm, and that no second shielding layer was formed, to prepare a sample tape.

Comparative Example D2

A procedure similar to that in Example A1 was carried out, except that the first shielding layer was changed to a Pd layer having a thickness of 5 nm, and that the second shielding layer was changed to a Ti layer having a thickness of 5 nm, to prepare a sample tape.

Comparative Example D3

A procedure similar to that in Example A1 was carried out, except that the first shielding layer was changed to a Pd layer having a thickness of 5 nm, and that the second shielding layer was changed to an Al layer having a thickness of 5 nm, to prepare a sample tape.

Comparative Example D4

A procedure similar to that in Example A1 was carried out, except that the first shielding layer was changed to a Ti layer having a thickness of 0.5 nm, and that the second shielding layer was changed to a Pd layer having a thickness of 0.5 nm, to prepare a sample tape.

Comparative Example D5

A procedure similar to that in Example A1 was carried out, except that the first shielding layer was changed to a Ti layer having a thickness of 50 nm, and that the second shielding layer was changed to a Pd layer having a thickness of 20 nm, to prepare a sample tape.

With respect to each of the above-prepared sample tapes in Examples D1 to D7 and Comparative Examples D1 to D5, storage properties, magnetic properties, and electromagnetic conversion properties were evaluated. The evaluation ratings for the individual measurements are as shown in the Table 1 above.

The results of evaluation of the sample tapes in Examples D1 to D7 and Comparative Examples D1 to D5 are shown in Tables 8 and 9 below.

TABLE 8

|  | Material and thickness of first shielding layer | Material and thickness of second shielding layer | Total thickness (nm) of shielding layers | Storage properties | Magnetic properties | Electromagnetic conversion properties |
|---|---|---|---|---|---|---|
| Ex. D1 | Ti, 1 nm | Pd, 1 nm | 2 | ⊚ | ⊚ | ⊚ |
| Ex. D2 | Ti, 10 nm | Pd, 40 nm | 50 | ⊚ | ⊚ | ○ |
| Ex. D3 | Ti, 40 nm | Pd, 10 nm | 50 | ⊚ | ⊚ | ○ |
| Ex. D4 | Ti, 5 nm | Pd, 5 nm | 10 | ⊚ | ⊚ | ⊚ |
| Ex. D5 | Ti-W alloy, 5 nm | Pd, 5 nm | 10 | ⊚ | ⊚ | ⊚ |
| Ex. D6 | Al, 5 nm | Pd, 5 nm | 10 | ⊚ | ⊚ | ⊚ |
| Ex. D7 | Al-Si alloy, 5 nm | Pd, 5 nm | 10 | ⊚ | ⊚ | ⊚ |

TABLE 9

|  | Material and thickness of first shielding layer | Material and thickness of second shielding layer | Total thickness (nm) of shielding layers | Storage properties | Magnetic properties | Electromagnetic conversion properties |
|---|---|---|---|---|---|---|
| Comp. Ex. D1 | Pd, 10 nm | None | 10 | X | ⊚ | ⊚ |
| Comp. Ex. D2 | Pd, 5 nm | Ti, 5 nm | 10 | ⊚ | X | X |
| Comp. Ex. D3 | Pd, 5 nm | Al, 5 nm | 10 | ⊚ | X | X |
| Comp. Ex. D4 | Ti, 0.5 nm | Pd, 0.5 nm | 1 | X | ⊚ | ⊚ |
| Comp. Ex. D5 | Ti, 50 nm | Pd, 20 nm | 70 | ○ | ⊚ | X |

Examples D1 to D7 are examples in which the first shielding layer is comprised of Ti or Al, or an alloy of any one of them and the second shielding layer is comprised of Pd. In a case where the shielding layers of a double-layer structure in this configuration were formed, the storage properties were remarkably improved and no deterioration of the magnetic properties and electromagnetic conversion properties occurred.

Among Examples D1 to D4 and Comparative Examples D4 and D5, it is common that the first shielding layer is a Ti layer and the second shielding layer is a Pd layer, and the two shielding layers individually have different thickness. Examples D1 to D4 are examples in which the total thickness of the shielding layers is 2 to 50 nm. On the other hand, Comparative Example D4 is an example in which the total thickness of the shielding layers is 1 nm, and Comparative Example D5 is an example in which the total thickness of the shielding layers is 70 nm.

In Examples D1 to D4, the storage properties, magnetic properties, and electromagnetic conversion properties were excellent. By contrast, in Comparative Example D4, lowering of the storage properties was observed, and, in Comparative Example D5, lowering of the electromagnetic conversion properties was observed.

Specifically, in the case where the total thickness of the two shielding layers was 2 to 50 nm, deterioration of the magnetic layer was prevented by the two shielding layers. In the case where the total thickness was smaller than 2 nm (Comparative Example D4), the results were similar to those of the sample tape having no shielding layer (Comparative Example A1 in Experiment A), indicating that the stacked film of the Ti layer and Pd layer did not function as a shielding layer.

On the other hand, in the case where the total thickness of the two shielding layers was more than 50 nm (Comparative Example D5), the storage properties were improved, but the electromagnetic conversion properties deteriorated. The reason for this is presumed that the shielding layers having an increased thickness roughen the surface of the magnetic layer. The phenomenon in which the surface of the magnetic layer is roughened if the thickness of the shielding layers is increased can be confirmed by, for example, examination under a scanning electron microscope (SEM).

Comparative Examples D2 and D3 are examples in which the material for the first shielding layer is Pd and the material for the second shielding layer is Ti or Al. Comparative Example D2 corresponds to an example in which the first shielding layer and the second shielding layer in Example D4 are switched. The materials for and the thickness of the individual shielding layers are common to Comparative Example D2 and Example D4. Similarly, Comparative Example D3 and Example D6 are different only in the configuration of the two shielding layers.

In Examples D4 and D6, excellent results were obtained, whereas, in Comparative Examples D2 and D3, only the storage properties were excellent and the magnetic properties and the electromagnetic conversion properties deteriorated. From this, it is apparent that not only the materials for and the thickness of the individual shielding layers but also the configuration of the two shielding layers affect the function of the shielding layer.

Experiment E

Next, sample magnetic tapes in the Examples of the present invention, in which the thickness of the first shielding layer 3 was limited to 1 to 10 nm and the thickness of the second shielding layer 4 was limited to 1 to 10 nm, were prepared, and evaluated in respect of electromagnetic conversion properties.

Example E1

As the first shielding layer, a Ti layer was formed. The first shielding layer was deposited by a sputtering process so that the thickness became 1 nm. Subsequently, on the first shielding layer, a Cu layer was formed as the second shielding layer. The second shielding layer was deposited by a sputtering process so that the thickness became 1 nm.

Example E2

A procedure similar to that in Example E1 was carried out, except that the thickness of the first shielding layer was changed to 1 nm, and that the thickness of the second shielding layer was changed to 5 nm, to prepare a sample tape.

Example E3

A procedure similar to that in Example E1 was carried out, except that the thickness of the first shielding layer was changed to 1 nm, and that the thickness of the second shielding layer was changed to 10 nm, to prepare a sample tape.

Example E4

A procedure similar to that in Example E1 was carried out, except that the thickness of the first shielding layer was changed to 5 nm, and that the thickness of the second shielding layer was changed to 1 nm, to prepare a sample tape.

Example E5

A procedure similar to that in Example E1 was carried out, except that the thickness of the first shielding layer was changed to 5 nm, and that the thickness of the second shielding layer was changed to 5 nm, to prepare a sample tape.

Example E6

A procedure similar to that in Example E1 was carried out, except that the thickness of the first shielding layer was changed to 5 nm, and that the thickness of the second shielding layer was changed to 10 nm, to prepare a sample tape.

Example E7

A procedure similar to that in Example E1 was carried out, except that the thickness of the first shielding layer was changed to 10 nm, and that the thickness of the second shielding layer was changed to 1 nm, to prepare a sample tape.

Example E8

A procedure similar to that in Example E1 was carried out, except that the thickness of the first shielding layer was changed to 10 nm, and that the thickness of the second shielding layer was changed to 5 nm, to prepare a sample tape.

Example E9

A procedure similar to that in Example E1 was carried out, except that the thickness of the first shielding layer was changed to 10 nm, and that the thickness of the second shielding layer was changed to 10 nm, to prepare a sample tape.

Example E10

A procedure similar to that in Example E1 was carried out, except that the first shielding layer was changed to a TiW layer having a thickness of 5 nm, and that the thickness of the second shielding layer was changed to 5 nm, to prepare a sample tape.

Comparative Example E1

A procedure similar to that in Example E1 was carried out, except that no shielding layer was formed, to prepare a sample tape.

Comparative Example E2

A procedure similar to that in Example E1 was carried out, except that the thickness of the first shielding layer was changed to 1 nm, and that no second shielding layer was formed, to prepare a sample tape.

Comparative Example E3

A procedure similar to that in Example E1 was carried out, except that the thickness of the first shielding layer was changed to 5 nm, and that no second shielding layer was formed, to prepare a sample tape.

Comparative Example E4

A procedure similar to that in Example E1 was carried out, except that the thickness of the first shielding layer was changed to 10 nm, and that no second shielding layer was formed, to prepare a sample tape.

Comparative Example E5

A procedure similar to that in Example E1 was carried out, except that the thickness of the first shielding layer was changed to 15 nm, and that the thickness of the second shielding layer was changed to 5 nm, to prepare a sample tape.

Comparative Example E6

A procedure similar to that in Example E1 was carried out, except that the thickness of the first shielding layer was changed to 1 nm, and that the thickness of the second shielding layer was changed to 15 nm, to prepare a sample tape.

Comparative Example E7

Substantially the same procedure as in Example E1 was repeated, except that the thickness of the first shielding layer was changed to 5 nm, and that the thickness of the second shielding layer was changed to 15 nm, to prepare a sample tape.

Comparative Example E8

A procedure similar to that in Example E1 was carried out, except that the thickness of the first shielding layer was changed to 10 nm, and that the thickness of the second shielding layer was changed to 15 nm, to prepare a sample tape.

With respect to each of the above-prepared sample tapes, using the methods described below, electromagnetic conversion properties (C/N) and surface roughness were evaluated.

The electromagnetic conversion properties were measured using a drum tester. As a head for reproduction, an MR head having a track width of 5 μm was used. A ratio of carrier output to medium noise (C/N ratio) at a recording wavelength of 0.5 μm was determined and represented using the value of the sample tape in Comparative Example E1 having no shielding layer as a reference, and a sample tape having a C/N ratio of a positive number was evaluated to be practically excellent.

Figure 8:
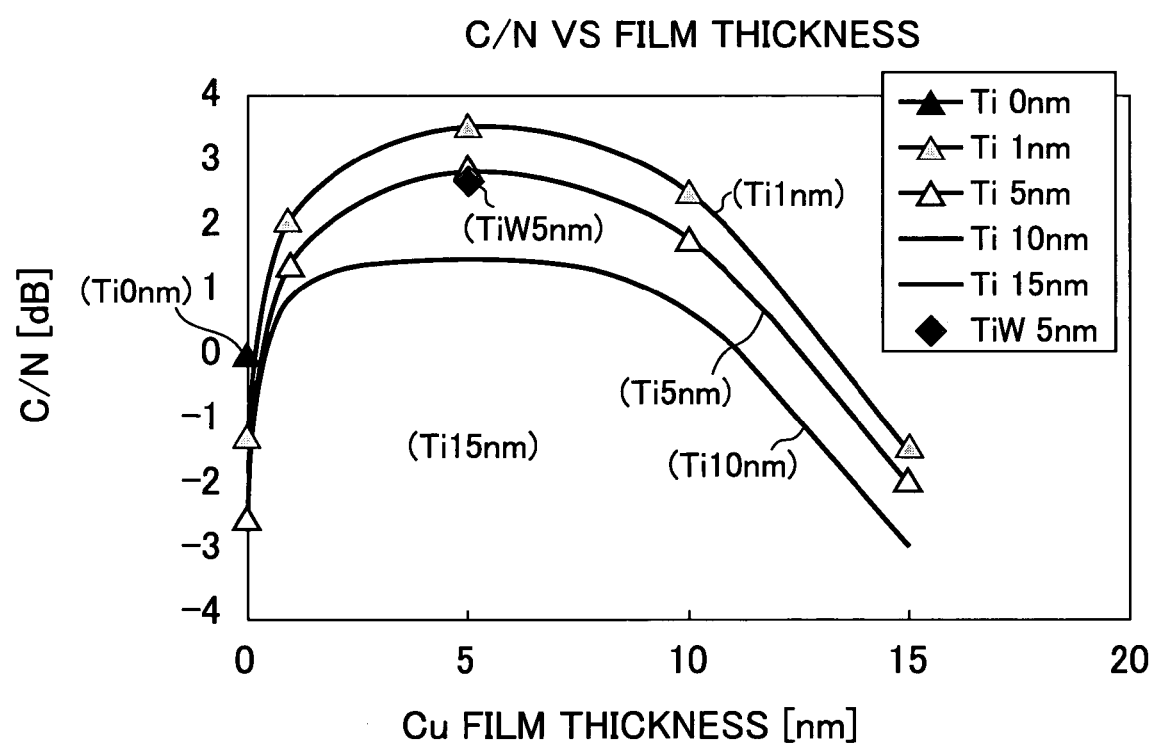
FIG. 8 is a graph showing relationship between the thickness of the first shielding layer and the second shielding layer and electromagnetic conversion properties.

With respect to the surface roughness, an Ra value of a 5 μm×5 μm area was measured using SPM (NanoScope 3, manufactured and sold by Digital Instruments). With respect to each of the sample tapes in Examples E1 to E10 and the sample tapes in Comparative Examples E1 to E8, the materials for and the thickness of the first shielding layer and the second shielding layer are shown in Table 10 below, and the relationship between the thickness of these layers and the electromagnetic conversion properties (C/N) is shown in FIG. 8.

TABLE 10

|  | Material and thickness of first shielding layer | Material and thickness of second shielding layer |
|---|---|---|
| Ex. E1 | Ti, 1 nm | Cu, 1 nm |
| Ex. E2 | Ti, 1 nm | Cu, 5 nm |
| Ex. E3 | Ti, 1 nm | Cu, 10 nm |
| Ex. E4 | Ti, 5 nm | Cu, 1 nm |
| Ex. E5 | Ti, 5 nm | Cu, 5 nm |
| Ex. E6 | Ti, 5 nm | Cu, 10 nm |
| Ex. E7 | Ti, 10 nm | Cu, 1 nm |
| Ex. E8 | Ti, 10 nm | Cu, 5 nm |
| Ex. E9 | Ti, 10 nm | Cu, 10 nm |
| Ex. E10 | TiW, 5 nm | Cu, 5 nm |
| Comp. Ex. E1 | None | None |
| Comp. Ex. E2 | Ti, 1 nm | None |
| Comp. Ex. E3 | Ti, 5 nm | None |
| Comp. Ex. E4 | Ti, 10 nm | None |
| Comp. Ex. E5 | Ti, 15 nm | Cu, 5 nm |
| Comp. Ex. E6 | Ti, 1 nm | Cu, 15 nm |
| Comp. Ex. E7 | Ti, 5 nm | Cu, 15 nm |
| Comp. Ex. E8 | Ti, 10 nm | Cu, 15 nm |

Examples E1 to E10 are examples in which the first shielding layer is comprised of a Ti metal or an alloy thereof (TiW) and the second shielding layer is comprised of Cu, and the thickness of each layer is 1 to 10 nm. If the shielding layers of a double-layer structure in this configuration were formed, as apparent from FIG. 8, all the C/N's were of a positive number and practically excellent electromagnetic conversion properties were obtained.

Comparative Example E1 is an example in which neither first shielding layer nor second shielding layer are formed, and taken as a reference value (0 dB) of the electromagnetic conversion properties. Comparative Examples E2 to E8 are examples in which the thickness of the first shielding layer or the second shielding layer is a value other than 1 to 10 nm, and all the C/N's in these examples were of a negative number and practically excellent electromagnetic conversion properties were not obtained.

Figure 9:
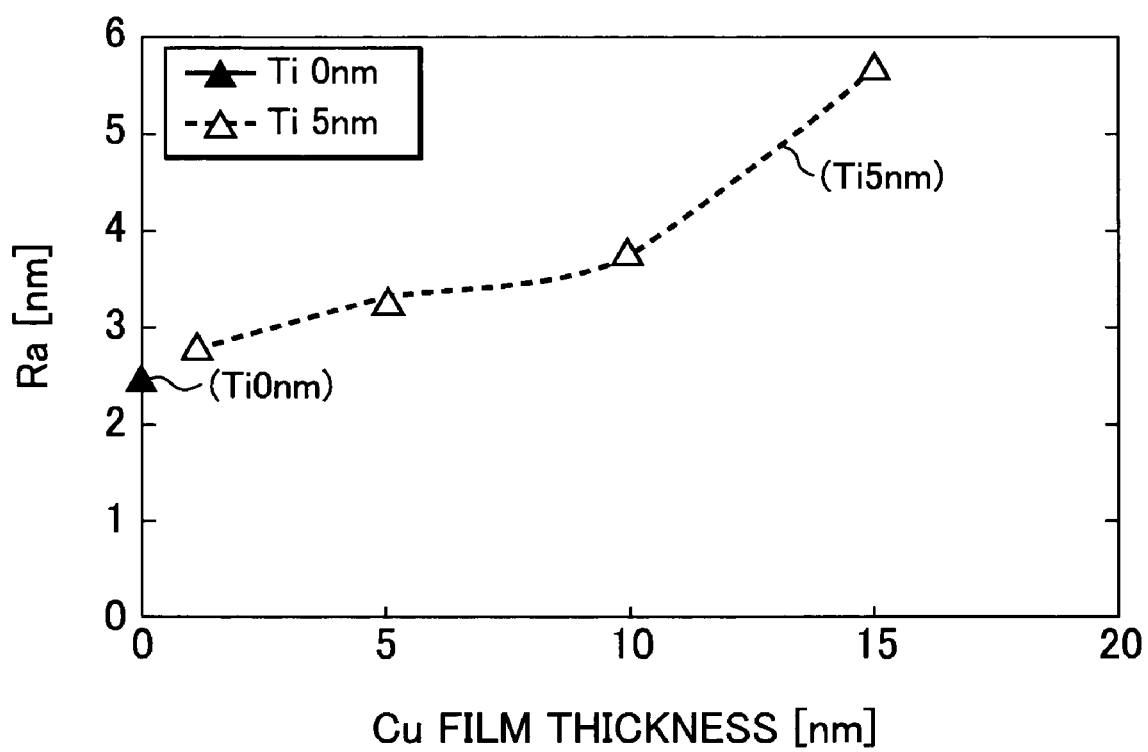
FIG. 9 is a graph showing relationship between the thickness of the second shielding layer and a surface roughness.

Next, with respect to each of the sample tapes in Examples E4 to E6 and Comparative Examples E1 and E7, a surface roughness Ra was measured, and the relationship between the thickness of the first shielding layer and the second shielding layer and the surface roughness Ra is shown in FIG. 9.

As shown in FIG. 9, in Comparative Example E1 and Examples E4 to E6, in which the thickness of the second shielding layer was 10 nm or less, the surface roughness Ra was about 2 to 4 nm and the slope of the Ra increase was gradual. By contrast, in Comparative Example E7 in which the thickness of the second shielding layer was more than 10 nm, the surface roughness Ra value was rapidly increased, so that a noise increased, while causing the electromagnetic conversion properties to rapidly deteriorate.

As is apparent from the above, the thickness of the first shielding layer 3 being 1 to 10 nm and the thickness of the second shielding layer 4 being 1 to 10 nm especially make the medium noise be effectively suppressed, which leads to improvement in the electromagnetic conversion properties (C/N) of the magnetic tape medium. That is, there can be obtained a magnetic tape with high recording density which is advantageously used in various applications including data streamer application and data storage application using a high sensitivity magnetic head, such as an MR head or a GMR head.

In the Experiment E above, with respect to the magnetic recording medium in which the first shielding layer is a Ti layer or a Ti alloy layer (TiW layer) and the second shielding layer is a Cu layer, explanation is made with reference to the specific examples, but the magnetic recording medium of the present invention is not limited to the above examples, and it has been confirmed that similar results are obtained from a magnetic recording medium having a construction in which an Al layer or an Al alloy layer is formed as the first shielding layer and a metal layer comprised of any one of Ni, Ag, Au, Pd, and Cr is formed as the second shielding layer.

As described above in detail, in the magnetic recording medium of the present invention, the storage properties of the magnetic tape medium can be remarkably improved without causing the magnetic properties and electromagnetic conversion properties to deteriorate.

The magnetic recording medium of the present invention can be applied to, for example, a helical scan method and a linear method, and can be effectively applied to any magnetic recording tape media in which the magnetic layer is formed by a vacuum thin film formation technique and the thickness of the magnetic layer is as small as 55 nm or less, and can be changed or modified as long as the effects aimed at by the present invention are not sacrificed.

What is claimed is:

1. A magnetic recording medium comprising:
   an elongated nonmagnetic substrate;
   a first shielding layer, formed on said nonmagnetic substrate, being comprised of a metal or an alloy;

a second shielding layer, formed on said first shielding layer, being comprised of a material which is more difficult to oxidize than said first shielding layer, wherein a total thickness of said first shielding layer and said second shielding layer is 2 to 50 nm; and a magnetic layer, formed on said second shielding layer by a vacuum thin film formation technique, having a thickness of 55 nm or less, wherein said first shielding layer is a metal layer comprised of at least one of Al, Ti, an alloy of Al, and an alloy of Ti, and wherein said second shielding layer is a metal layer comprised of any one of Ni, Cu, Ag, Au, and Pd.

2. The magnetic recording medium according to claim 1, wherein a signal recorded on said magnetic layer is reproduced by slide-contact with a magnetoresistive magnetic head or a giant magnetoresistive magnetic head.

3. A magnetic recording medium comprising:

an elongated nonmagnetic substrate;

a first shielding layer, formed on said nonmagnetic substrate, being comprised of a metal or an alloy, and having a thickness of 1 to 10 nm;

a second shielding layer, formed on said first shielding layer, being comprised of a material which is more difficult to oxidize than said first shielding layer, and having a thickness of 1 to 10 nm; and a magnetic layer, formed on said second shielding layer by a vacuum thin film formation technique, having a thickness of 55 nm or less, wherein said first shielding layer is a metal layer comprised of at least one of Al, Ti, an alloy of Al, and an alloy of Ti, and wherein said second shielding layer is a metal layer comprised of any one of Ni, Cu, Ag, Au, Pd, and Cr.

4. The magnetic recording medium according to claim 3, wherein a signal recorded on said magnetic layer is reproduced by slide-contact with a magnetoresistive magnetic head or a giant magnetoresistive magnetic head.

5. A magnetic recording medium comprising:

an elongated nonmagnetic substrate;

a first shielding layer, formed on said nonmagnetic substrate, being comprised of a metal or an alloy;

a second shielding layer, formed on said first shielding layer, being comprised of a material which is more difficult to oxidize than said first shielding layer, wherein a total thickness of said first shielding layer and said second shielding layer is 2 to 50 nm; and a magnetic layer, formed on said second shielding layer by a vacuum thin film formation technique, having a thickness of 55 nm or less, wherein said first shielding layer is a metal layer comprised of at least one of Al, Ti, an alloy of Al, and an alloy of Ti, and wherein said second shielding layer is one of a silicon oxide layer and a silicon nitride layer.

6. The magnetic recording medium according to claim 5, wherein a signal recorded on said magnetic layer is reproduced by slide-contact with a magnetoresistive magnetic head or a giant magnetoresistive magnetic head.

* * * * *